United States Patent
Nuhoglu et al.

(10) Patent No.: US 12,293,635 B2
(45) Date of Patent: May 6, 2025

(54) SYSTEMS AND METHODS FOR TOKENIZATION OF DIGITAL ASSETS ASSOCIATED WITH ELECTRONIC GAMING

(71) Applicant: Aristocrat Technology Australia Pty Limited, North Ryde (AU)

(72) Inventors: Altay Nuhoglu, Eastwood (AU); Stephen Shaffer, Jr., Las Vegas, NV (US); Frank Rodriguez, Las Vegas, NV (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 296 days.

(21) Appl. No.: 17/949,737

(22) Filed: Sep. 21, 2022

(65) Prior Publication Data

US 2023/0094247 A1 Mar. 30, 2023

Related U.S. Application Data

(60) Provisional application No. 63/248,193, filed on Sep. 24, 2021.

(51) Int. Cl.
*G07F 17/32* (2006.01)
*G06Q 20/38* (2012.01)
*G06Q 50/34* (2012.01)

(52) U.S. Cl.
CPC ....... *G07F 17/3244* (2013.01); *G06Q 20/389* (2013.01); *G06Q 50/34* (2013.01); *G07F 17/3225* (2013.01); *G07F 17/3241* (2013.01)

(58) Field of Classification Search
CPC ............. G07F 17/3244; G07F 17/3225; G07F 17/3241; G06Q 20/389; G06Q 50/34; G06Q 20/02
USPC ......................................................... 463/40
See application file for complete search history.

(56) References Cited

U.S. PATENT DOCUMENTS

| | | | |
|---|---|---|---|
| 2023/0055064 A1* | 2/2023 | Dalmia | G06Q 20/02 |
| 2024/0046753 A1* | 2/2024 | Nelson | G07F 17/3244 |
| 2024/0062621 A1* | 2/2024 | Hufnagl-Abraham | G07F 17/3225 |
| 2024/0075392 A1* | 3/2024 | Jaffe | A63F 13/792 |

* cited by examiner

*Primary Examiner* — Pierre E Elisca
(74) *Attorney, Agent, or Firm* — Armstrong Teasdale LLP

(57) ABSTRACT

A blockchain system for supporting electronic gaming on a plurality of electronic gaming devices a primary blockchain and a system server participating in the primary blockchain. The primary blockchain defines a partially fungible tokens configured to be used for game play for a first gaming operator. The system server is configured to (i) identify a game outcome from a play of an electronic game based on output of a random number generator, the game outcome includes an award amount of PFTs; (ii) generate a blockchain transaction that includes an operator address as a funds source account of the blockchain transaction, a player address as a destination account of the blockchain transaction, and the award amount of PFTs; and (iii) transmit the blockchain transaction into the primary blockchain, thereby transferring the award amount of PFTs.

20 Claims, 11 Drawing Sheets

SYSTEMS AND METHODS FOR TOKENIZATION OF DIGITAL ASSETS ASSOCIATED WITH ELECTRONIC GAMING

CROSS-REFERENCE TO RELATED APPLICATIONS

The present application claims the benefit of priority to U.S. Provisional Patent Application No. 63/248,193, filed on Sep. 24, 2021, entitled "SYSTEMS AND METHODS FOR TOKENIZATION OF DIGITAL ASSETS ASSOCIATED WITH ELECTRONIC GAMING", which is herein incorporated by reference in its entirety.

TECHNICAL FIELD

The field of disclosure relates generally to electronic gaming, and more particularly to systems and methods for tokenization of digital assets associated with electronic gaming.

BACKGROUND

Electronic gaming machines ("EGMs") or gaming devices provide a variety of wagering games such as slot games, video poker games, video blackjack games, roulette games, video bingo games, keno games and other types of games that are frequently offered at casinos and other locations. Play on EGMs typically involves a player establishing a credit balance by inputting money, or another form of monetary credit, and placing a monetary wager (from the credit balance) on one or more outcomes of an instance (or single play) of a primary or base game. In some cases, a player may qualify for a special mode of the base game, a secondary game, or a bonus round of the base game by attaining a certain winning combination or triggering event in, or related to, the base game, or after the player is randomly awarded the special mode, secondary game, or bonus round. In the special mode, secondary game, or bonus round, the player is given an opportunity to win extra game credits, game tokens or other forms of payout. In the case of "game credits" that are awarded during play, the game credits are typically added to a credit meter total on the EGM and can be provided to the player upon completion of a gaming session or when the player wants to "cash out."

"Slot" type games are often displayed to the player in the form of various symbols arrayed in a row-by-column grid or matrix. Specific matching combinations of symbols along predetermined paths (or paylines) through the matrix indicate the outcome of the game. The display typically highlights winning combinations/outcomes for identification by the player. Matching combinations and their corresponding awards are usually shown in a "pay-table" which is available to the player for reference. Often, the player may vary his/her wager to include differing numbers of paylines and/or the amount bet on each line. By varying the wager, the player may sometimes alter the frequency or number of winning combinations, frequency or number of secondary games, and/or the amount awarded.

Typical games use a random number generator (RNG) to randomly determine the outcome of each game. The game is designed to return a certain percentage of the amount wagered back to the player over the course of many plays or instances of the game, which is generally referred to as return to player (RTP). The RTP and randomness of the RNG ensure the fairness of the games and are highly regulated. Upon initiation of play, the RNG randomly determines a game outcome and symbols are then selected which correspond to that outcome. Notably, some games may include an element of skill on the part of the player and are therefore not entirely random.

BRIEF DESCRIPTION

In one aspect, a blockchain system for providing digital assets within a blockchain network of participating electronic devices is described. The blockchain system includes an electronic gaming device of the participating electronic devices configured to participate in the blockchain. The electronic gaming device includes a memory storing at least one node associated with the blockchain network and at least one processor configured to execute instructions. The instructions, when executed, cause the at least one processor to determine a number of partially fungible tokens (PFTs) to be assigned to a player account, the PFTs resulting from an electronic game outcome, generate a blockchain transaction including at least the number of PFTs and a player account identifier (ID) associated with the player account, and transmit the blockchain transaction to the at least one node for addition to the blockchain network.

In another aspect, a blockchain system for supporting electronic gaming on a plurality of electronic gaming devices is provided. The blockchain system includes a primary blockchain defining a first set of tokens configured to be used for game play for a first gaming operator, the first set of tokens being partially fungible tokens (PFTs) on the primary blockchain. The blockchain system also includes a system server participating in the primary blockchain. The system server includes at least one processor executing instructions that are configured to cause the at least one processor to: (i) identify a game outcome from a play of an electronic game based on output of a random number generator, the game outcome includes an award amount of PFTs; (ii) generate a blockchain transaction that includes an operator address as a funds source account of the blockchain transaction, a player address as a destination account of the blockchain transaction, and the award amount of PFTs; and (iii) transmit the blockchain transaction into the primary blockchain, thereby transferring the award amount of PFTs.

In yet another aspect, a method for supporting electronic gaming is provided. The method includes creating a first set of tokens on a first blockchain, the first set of tokens being configured to facilitate game play transactions for an electronic game of a first gaming operator, the first set of tokens being partially fungible tokens (PFTs) on the first blockchain. The method also includes identifying a game outcome from a play of the electronic game based on output of a random number generator, the game outcome includes an award amount of PFTs. The method further includes generating a blockchain transaction that includes an operator address as a funds source account of the blockchain transaction, a player address as a destination account of the blockchain transaction, and the award amount of PFTs. The method also includes transmitting the blockchain transaction into the first blockchain, thereby transferring the award amount of PFTs.

In still another aspect, a blockchain system is provided. The blockchain system includes a memory storing a primary blockchain. The blockchain system also includes at least one processor executing instructions that are configured to cause the at least one processor to: (i) create a first set of tokens as partially fungible tokens (PFTs) on the primary blockchain, the first set of tokens being configured to be used for game play for a first gaming operator; (ii) identify a game outcome from a play of an electronic game based on output of a random number generator, the game outcome includes an award amount of PFTs; (iii) generate a blockchain transaction that includes an operator address as a funds source account of the blockchain transaction, a player address as a destination account of the blockchain transaction, and the award amount of PFTs; and (iv) transmit the blockchain transaction into the primary blockchain, thereby transferring the award amount of PFTs.

DETAILED DESCRIPTION

Figure 1:
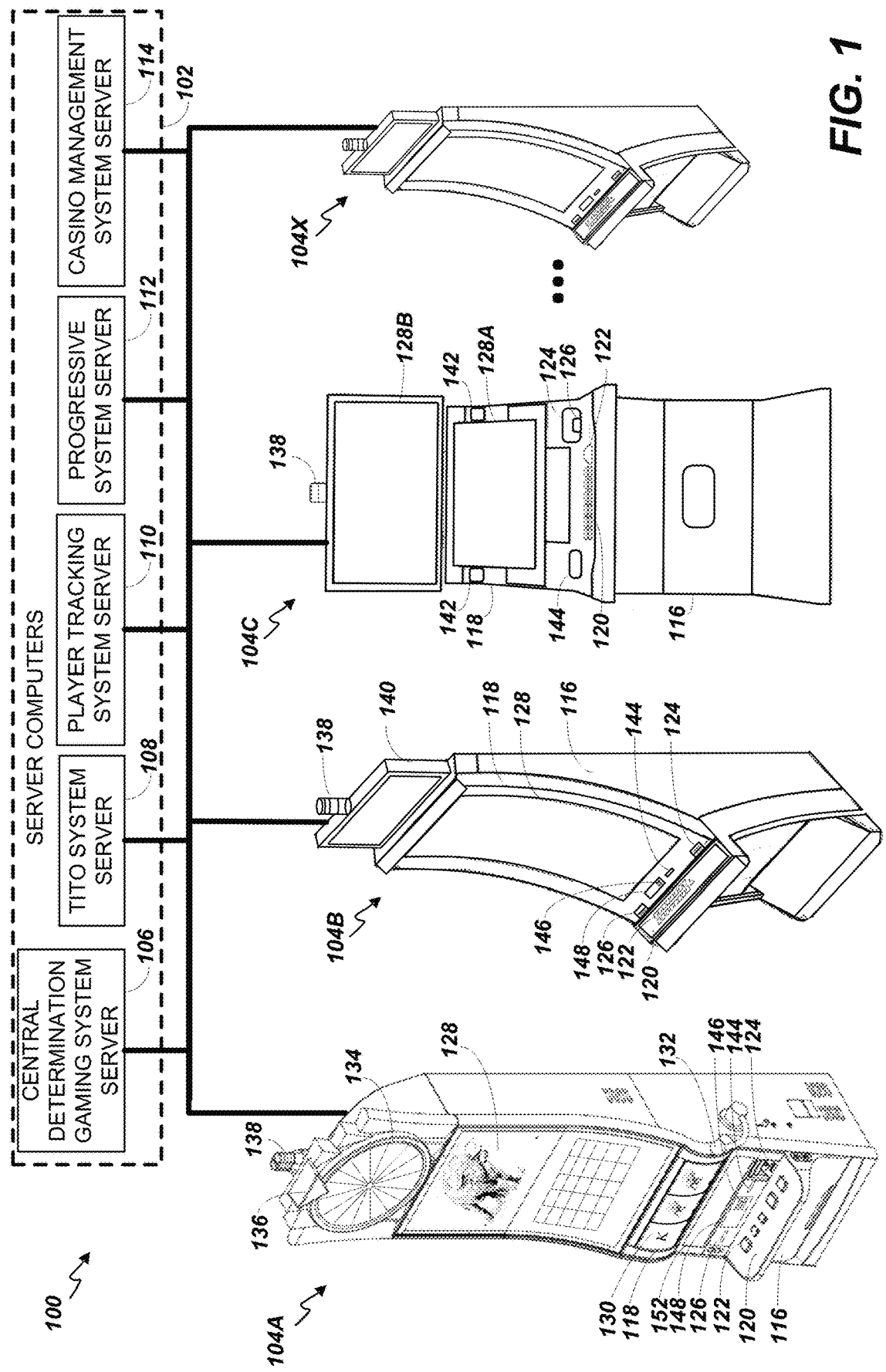
FIG. 1 is an exemplary diagram showing several EGMs networked with various gaming related servers.

Blockchain is a digital platform and technology behind certain cryptocurrencies. Blockchain is intended to create faster, more efficient ways to transmit, receive, and track transactions using secure data (e.g., from account to account within the blockchain). When a transaction occurs, it is broadcasted to the entire network (e.g., that transaction is added to every individual's copy of the blockchain ledger). After a certain amount of entries into the ledger, that ledger is defined as a block and secured using a cryptographic hash function called a proof of work (PoW). The proof is unique to the content of the block, such that changing the contents of the block changes the proof. The group or individual that creates the proof is called the block creator and is given a reward (e.g., known as mining). A transaction can include a tip to incentivize the block creator to include the transaction in that block, thus paying larger fees can speed up a transaction. This fee is called gas. The proof is written onto the next block, such that if any block preceding it is changed, every block proceeding it will have to have new proofs, thereby requiring forgeries to create proofs faster than the rest of the network combined, thus creating a blockchain.

A wallet is a public and private key pair. All holdings (HODL) one owns exist somewhere on the blockchain associated with its public key. The private key pair generates a proof to the network that those assets belong to that wallet. Transferring funds is essentially changing the public key associated with those coins or tokens.

A coin is a discrete quanta of exchangeable and fungible value on a blockchain. Each coin enables individuals to make payments using digital currency. A token is a coin with an agreement for its use.

A partially fungible token (PFT) is a token standard with variable "use" defined as "partitions". A PFT is only fungible with tokens with the same use that exist in the same partition. The use is defined by the PFT's smart contract. Security tokens allow for the assignment of arbitrary data to a transaction for a smart contract to determine the receiver's authorization and partition. Such data can restrict who can trade tokens (e.g., allowed (e.g., whitelisted) wallets can trade to anyone, and non-allowed (e.g., blacklisted or non-whitelisted) wallets can only trade to allowed wallets).

A blockchain system is described herein for supporting various types of gaming, such as wager-based gaming (e.g., using land-based electronic gaming machines ("EGMs") or digital real money gaming ("RMG") as well as social gaming (e.g., digital gaming using virtual currencies). In an example embodiment, a blockchain is provided by the blockchain system that establishes and tracks multiple token types for the various types of gaming, for various particular games, and for multiple operators (e.g., for different casinos). The blockchain system uses blockchain partitions to create and maintain these various token types for their specific uses. An owner or manager of the blockchain system provides the blockchain system for the benefit of operators (e.g., casinos) and players (e.g., patrons of the casinos). The blockchain system acts as a central exchange for the various types of tokens, allowing new casinos to join the blockchain system, define new token types for various use cases (e.g., for particular games, casino locations, or such), mint tokens of those token types, and define how those tokens are going to be used in gaming. A player may purchase or otherwise receive one or more electronic gaming tokens ("EGTs", or sometimes just "tokens") and use the EGTs in electronic gaming at the casinos. In the example embodiment, each EGT is a partially fungible token (PFT) (e.g., as defined elsewhere herein).

As used herein, the term "gaming entity" refers to an entity including any or all of the various entities associated with gaming such as, but not limited to, casino operators, game manufacturers, game developers, game operators, and mobile application (e.g., for mobile devices) operators.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console. Gaming devices 104A-104X utilize specialized software and/or hardware to form non-generic, particular machines or apparatuses that comply with regulatory requirements regarding devices used for wagering or games of chance that provide monetary awards.

Communication between the gaming devices 104A-104X and the server computers 102, and among the gaming devices 104A-104X, may be direct or indirect using one or more communication protocols. As an example, gaming devices 104A-104X and the server computers 102 can communicate over one or more communication networks, such as over the Internet through a website maintained by a computer on a remote server or over an online data network including commercial online service providers, Internet service providers, private networks (e.g., local area networks and enterprise networks), and the like (e.g., wide area networks). The communication networks could allow gaming devices 104A-104X to communicate with one another and/or the server computers 102 using a variety of communication-based technologies, such as radio frequency (RF) (e.g., wireless fidelity (WiFi®) and Bluetooth®), cable TV, satellite links and the like.

In some implementation, server computers 102 may not be necessary and/or preferred. For example, in one or more implementations, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The mechanical reels 130 are independently spun and stopped to show a set of symbols within the gaming display area 118 which may be used to determine an outcome to the game.

In many configurations, the gaming device 104A may have a main display 128 (e.g., video display monitor) mounted to, or above, the gaming display area 118. The main display 128 can be a high-resolution liquid crystal display (LCD), plasma, light emitting diode (LED), or organic light emitting diode (OLED) panel which may be flat or curved as shown, a cathode ray tube, or other conventional electronically controlled video monitor.

In some implementations, the bill validator 124 may also function as a "ticket-in" reader that allows the player to use a casino issued credit ticket to load credits onto the gaming device 104A (e.g., in a cashless ticket ("TITO") system). In such cashless implementations, the gaming device 104A may also include a "ticket-out" printer 126 for outputting a credit ticket when a "cash out" button is pressed. Cashless TITO systems are used to generate and track unique barcodes or other indicators printed on tickets to allow players to avoid the use of bills and coins by loading credits using a ticket reader and cashing out credits using a ticket-out printer 126 on the gaming device 104A. The gaming device 104A can have hardware meters for purposes including ensuring regulatory compliance and monitoring the player credit balance. In addition, there can be additional meters that record the total amount of money wagered on the gaming device, total amount of money deposited, total amount of money withdrawn, total amount of winnings on gaming device 104A.

In some implementations, a player tracking card reader 144, a transceiver for wireless communication with a mobile device (e.g., a player's smartphone), a keypad 146, and/or an illuminated display 148 for reading, receiving, entering, and/or displaying player tracking information is provided in gaming device 104A. In such implementations, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some implementations, the information panel(s) 152 may be implemented as an additional video display.

Gaming devices 104A have traditionally also included a handle 132 typically mounted to the side of main cabinet 116 which may be used to initiate game play.

Figure 2A:
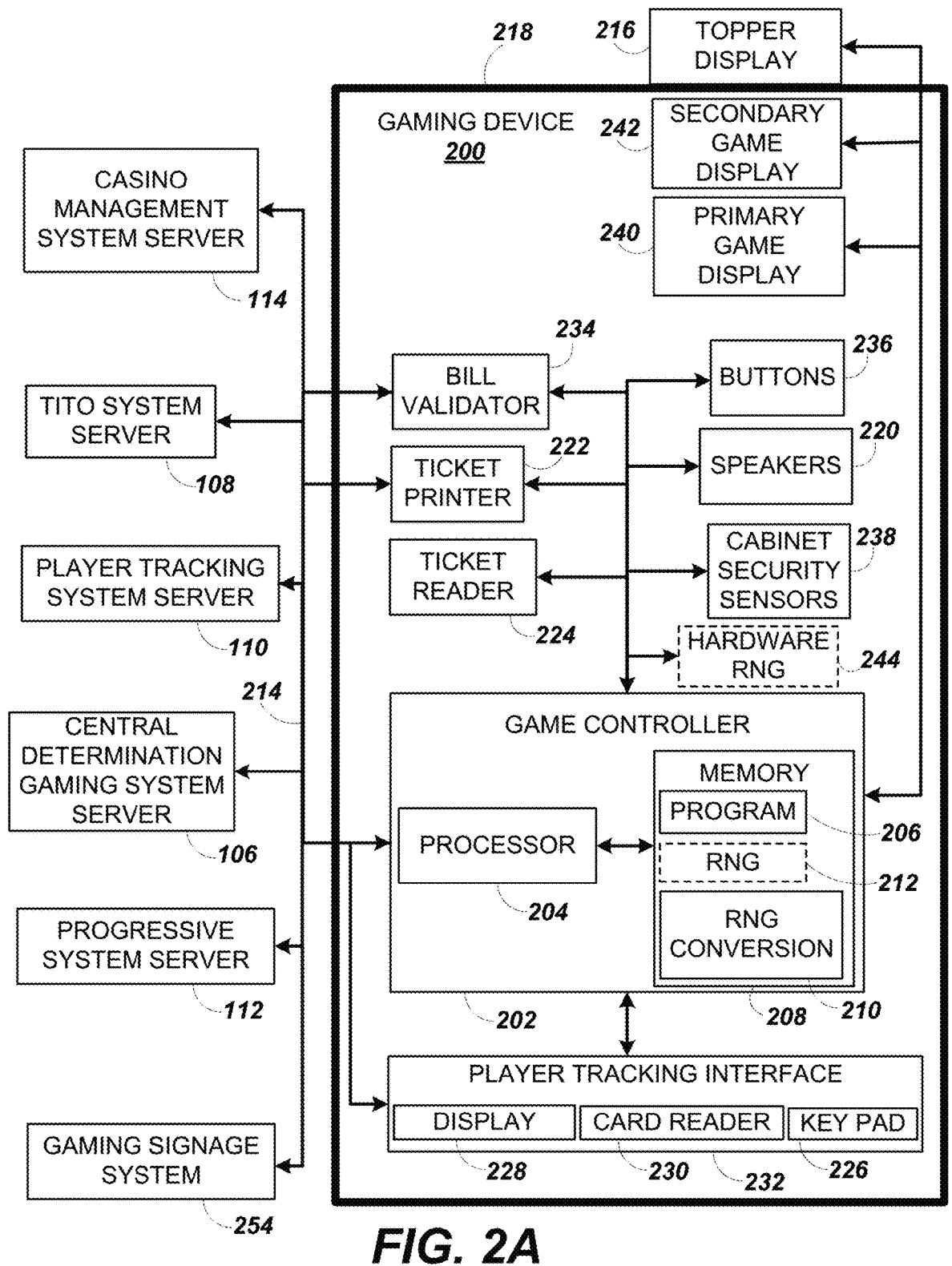
FIG. 2A is a block diagram showing various functional elements of an exemplary EGM.

Many or all the above described components can be controlled by circuitry (e.g., a game controller) housed inside the main cabinet 116 of the gaming device 104A, the details of which are shown in FIG. 2A.

An alternative example gaming device 104B illustrated in FIG. 1 is the Arc™ model gaming device manufactured by Aristocrat® Technologies, Inc. Note that where possible, reference numerals identifying similar features of the gaming device 104A implementation are also identified in the gaming device 104B implementation using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some implementations, the optional topper screen 140 may also or alternatively be used to display progressive jackpot prizes available to a player during play of gaming device 104B.

Example gaming device 104B includes a main cabinet 116 including a main door which opens to provide access to the interior of the gaming device 104B. The main or service door is typically used by service personnel to refill the ticket-out printer 126 and collect bills and tickets inserted into the bill validator 124. The main or service door may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the main display 128A may have a curvature radius from top to bottom, or alternatively from side to side. In some implementations, main display 128A is a flat panel display. Main display 128A is typically used for primary game play while secondary display 128B is typically used for bonus game play, to show game features or attraction activities while the game is not in play or any other information or media desired by the game designer or operator. In some implementations, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2A is a block diagram depicting exemplary internal electronic components of a gaming device 200 connected to various external systems. All or parts of the gaming device 200 shown could be used to implement any one of the example gaming devices 104A-X depicted in FIG. 1. As shown in FIG. 2A, gaming device 200 includes a topper display 216 or another form of a top box (e.g., a topper wheel, a topper screen, etc.) that sits above cabinet 218. Cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. Player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. FIG. 2 also depicts utilizing a ticket printer 222 to print tickets for a TITO system server 108. Gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

The games available for play on the gaming device 200 are controlled by a game controller 202 that includes one or more processors 204. Processor 204 represents a general-purpose processor, a specialized processor intended to perform certain functional tasks, or a combination thereof. As an example, processor 204 can be a central processing unit (CPU) that has one or more multi-core processing units and memory mediums (e.g., cache memory) that function as buffers and/or temporary storage for data. Alternatively, processor 204 can be a specialized processor, such as an application specific integrated circuit (ASIC), graphics processing unit (GPU), field-programmable gate array (FPGA), digital signal processor (DSP), or another type of hardware accelerator. In another example, processor 204 is a system on chip (SoC) that combines and integrates one or more general-purpose processors and/or one or more specialized processors. Although FIG. 2A illustrates that game controller 202 includes a single processor 204, game controller 202 is not limited to this representation and instead can include multiple processors 204 (e.g., two or more processors).

FIG. 2A illustrates that processor 204 is operatively coupled to memory 208. Memory 208 is defined herein as including volatile and nonvolatile memory and other types of non-transitory data storage components. Volatile memory is memory that do not retain data values upon loss of power. Nonvolatile memory is memory that do retain data upon a loss of power. Examples of memory 208 include random access memory (RAM), read-only memory (ROM), hard disk drives, solid-state drives, universal serial bus (USB) flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, examples of RAM include static random access memory (SRAM), dynamic random access memory (DRAM), magnetic random access memory (MRAM), and other such devices. Examples of ROM include a programmable read-only memory (PROM), an erasable programmable read-only memory (EPROM), an electrically erasable programmable read-only memory (EEPROM), or other like memory device. Even though FIG. 2A illustrates that game controller 202 includes a single memory 208, game controller 202 could include multiple memories 208 for storing program instructions and/or data.

Memory 208 can store one or more game programs 206 that provide program instructions and/or data for carrying out various implementations (e.g., game mechanics) described herein. Stated another way, game program 206 represents an executable program stored in any portion or component of memory 208. In one or more implementations, game program 206 is embodied in the form of source code that includes human-readable statements written in a programming language or machine code that contains numerical instructions recognizable by a suitable execution system, such as a processor 204 in a game controller or other system. Examples of executable programs include: (1) a compiled program that can be translated into machine code in a format that can be loaded into a random access portion of memory 208 and run by processor 204; (2) source code that may be expressed in proper format such as object code that is capable of being loaded into a random access portion of memory 208 and executed by processor 204; and (3) source code that may be interpreted by another executable program to generate instructions in a random access portion of memory 208 to be executed by processor 204.

Alternatively, game programs 206 can be set up to generate one or more game instances based on instructions and/or data that gaming device 200 exchanges with one or more remote gaming devices, such as a central determination gaming system server 106 (not shown in FIG. 2A but shown in FIG. 1). For purpose of this disclosure, the term "game instance" refers to a play or a round of a game that gaming device 200 presents (e.g., via a user interface (UI)) to a player. The game instance is communicated to gaming device 200 via the network 214 and then displayed on gaming device 200. For example, gaming device 200 may execute game program 206 as video streaming software that allows the game to be displayed on gaming device 200. When a game is stored on gaming device 200, it may be loaded from memory 208 (e.g., from a read only memory (ROM)) or from the central determination gaming system server 106 to memory 208.

Gaming devices, such as gaming device 200, are highly regulated to ensure fairness and, in many cases, gaming device 200 is operable to award monetary awards (e.g., typically dispensed in the form of a redeemable voucher). Therefore, to satisfy security and regulatory requirements in a gaming environment, hardware and software architectures are implemented in gaming devices 200 that differ significantly from those of general-purpose computers. Adapting general purpose computers to function as gaming devices 200 is not simple or straightforward because of: (1) the regulatory requirements for gaming devices 200, (2) the harsh environment in which gaming devices 200 operate, (3) security requirements, (4) fault tolerance requirements, and (5) the requirement for additional special purpose componentry enabling functionality of an EGM. These differences require substantial engineering effort with respect to game design implementation, game mechanics, hardware components, and software.

One regulatory requirement for games running on gaming device 200 generally involves complying with a certain level of randomness. Typically, gaming jurisdictions mandate that gaming devices 200 satisfy a minimum level of randomness without specifying how a gaming device 200 should achieve this level of randomness. To comply, FIG. 2A illustrates that gaming device 200 could include an RNG 212 that utilizes hardware and/or software to generate RNG outcomes that lack any pattern. The RNG operations are often specialized and non-generic in order to comply with regulatory and gaming requirements. For example, in a slot game, game program 206 can initiate multiple RNG calls to RNG 212 to generate RNG outcomes, where each RNG call and RNG outcome corresponds to an outcome for a reel. In another example, gaming device 200 can be a Class II gaming device where RNG 212 generates RNG outcomes for creating Bingo cards. In one or more implementations, RNG 212 could be one of a set of RNGs operating on gaming device 200. More generally, an output of the RNG 212 can be the basis on which game outcomes are determined by the game controller 202. Game developers could vary the degree of true randomness for each RNG (e.g., pseudorandom) and utilize specific RNGs depending on game requirements. The output of the RNG 212 can include a random number or pseudorandom number (either is generally referred to as a "random number").

In FIG. 2A, RNG 212 and hardware RNG 244 are shown in dashed lines to illustrate that RNG 212, hardware RNG 244, or both can be included in gaming device 200. In one implementation, instead of including RNG 212, gaming device 200 could include a hardware RNG 244 that generates RNG outcomes. Analogous to RNG 212, hardware RNG 244 performs specialized and non-generic operations in order to comply with regulatory and gaming requirements. For example, because of regulation requirements, hardware RNG 244 could be a random number generator that securely produces random numbers for cryptography use. The gaming device 200 then uses the secure random numbers to generate game outcomes for one or more game features. In another implementation, the gaming device 200 could include both hardware RNG 244 and RNG 212. RNG 212 may utilize the RNG outcomes from hardware RNG 244 as one of many sources of entropy for generating secure random numbers for the game features.

Another regulatory requirement for running games on gaming device 200 includes ensuring a certain level of RTP. Similar to the randomness requirement discussed above, numerous gaming jurisdictions also mandate that gaming device 200 provides a minimum level of RTP (e.g., RTP of at least 75%). A game can use one or more lookup tables (also called weighted tables) as part of a technical solution that satisfies regulatory requirements for randomness and RTP. In particular, a lookup table can integrate game features (e.g., trigger events for special modes or bonus games; newly introduced game elements such as extra reels, new symbols, or new cards; stop positions for dynamic game elements such as spinning reels, spinning wheels, or shifting reels; or card selections from a deck) with random numbers generated by one or more RNGs, so as to achieve a given level of volatility for a target level of RTP. (In general, volatility refers to the frequency or probability of an event such as a special mode, payout, etc. For example, for a target level of RTP, a higher-volatility game may have a lower payout most of the time with an occasional bonus having a very high payout, while a lower-volatility game has a steadier payout with more frequent bonuses of smaller amounts.) Configuring a lookup table can involve engineering decisions with respect to how RNG outcomes are mapped to game outcomes for a given game feature, while still satisfying regulatory requirements for RTP. Configuring a lookup table can also involve engineering decisions about whether different game features are combined in a given entry of the lookup table or split between different entries (for the respective game features), while still satisfying regulatory requirements for RTP and allowing for varying levels of game volatility.

FIG. 2A illustrates that gaming device 200 includes an RNG conversion engine 210 that translates the RNG outcome from RNG 212 to a game outcome presented to a player. To meet a designated RTP, a game developer can set up the RNG conversion engine 210 to utilize one or more lookup tables to translate the RNG outcome to a symbol element, stop position on a reel strip layout, and/or randomly chosen aspect of a game feature. As an example, the lookup tables can regulate a prize payout amount for each RNG outcome and how often the gaming device 200 pays out the prize payout amounts. The RNG conversion engine 210 could utilize one lookup table to map the RNG outcome to a game outcome displayed to a player and a second lookup table as a pay table for determining the prize payout amount for each game outcome. The mapping between the RNG outcome to the game outcome controls the frequency in hitting certain prize payout amounts.

FIG. 2A also depicts that gaming device 200 is connected over network 214 to player tracking system server 110. Player tracking system server 110 may be, for example, an OASIS® system manufactured by Aristocrat® Technologies, Inc. Player tracking system server 110 is used to track play (e.g. amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

When a player wishes to play the gaming device 200, he/she can insert cash or a ticket voucher through a coin acceptor (not shown) or bill validator 234 to establish a credit balance on the gaming device. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views with one or more UIs, the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Additionally, or alternatively, gaming devices 104A-104X and 200 can include or be coupled to one or more wireless transmitters, receivers, and/or transceivers (not shown in FIGS. 1 and 2A) that communicate (e.g., Bluetooth® or other near-field communication technology) with one or more mobile devices to perform a variety of wireless operations in a casino environment. Examples of wireless operations in a casino environment include detecting the presence of mobile devices, performing credit, points, comps, or other marketing or hard currency transfers, establishing wagering sessions, and/or providing a personalized casino-based experience using a mobile application. In one implementation, to perform these wireless operations, a wireless transmitter or transceiver initiates a secure wireless connection between a gaming device 104A-104X and 200 and a mobile device. After establishing a secure wireless connection between the gaming device 104A-104X and 200 and the mobile device, the wireless transmitter or transceiver does not send and/or receive application data to and/or from the mobile device. Rather, the mobile device communicates with gaming devices 104A-104X and 200 using another wireless connection (e.g., WiFi® or cellular network). In another implementation, a wireless transceiver establishes a secure connection to directly communicate with the mobile device. The mobile device and gaming device 104A-104X and 200 sends and receives data utilizing the wireless transceiver instead of utilizing an external network. For example, the mobile device would perform digital wallet transactions by directly communicating with the wireless transceiver. In one or more implementations, a wireless transmitter could broadcast data received by one or more mobile devices without establishing a pairing connection with the mobile devices.

Although FIGS. 1 and 2A illustrate specific implementations of a gaming device (e.g., gaming devices 104A-104X and 200), the disclosure is not limited to those implementations shown in FIGS. 1 and 2. For example, not all gaming devices suitable for implementing implementations of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or tabletops and have displays that face upwards. Gaming devices 104A-104X and 200 may also include other processors that are not separately shown. Using FIG. 2A as an example, gaming device 200 could include display controllers (not shown in FIG. 2A) configured to receive video input signals or instructions to display images on game displays 240 and 242. Alternatively, such display controllers may be integrated into the game controller 202. The use and discussion of FIGS. 1 and 2 are examples to facilitate ease of description and explanation.

Figure 2B:
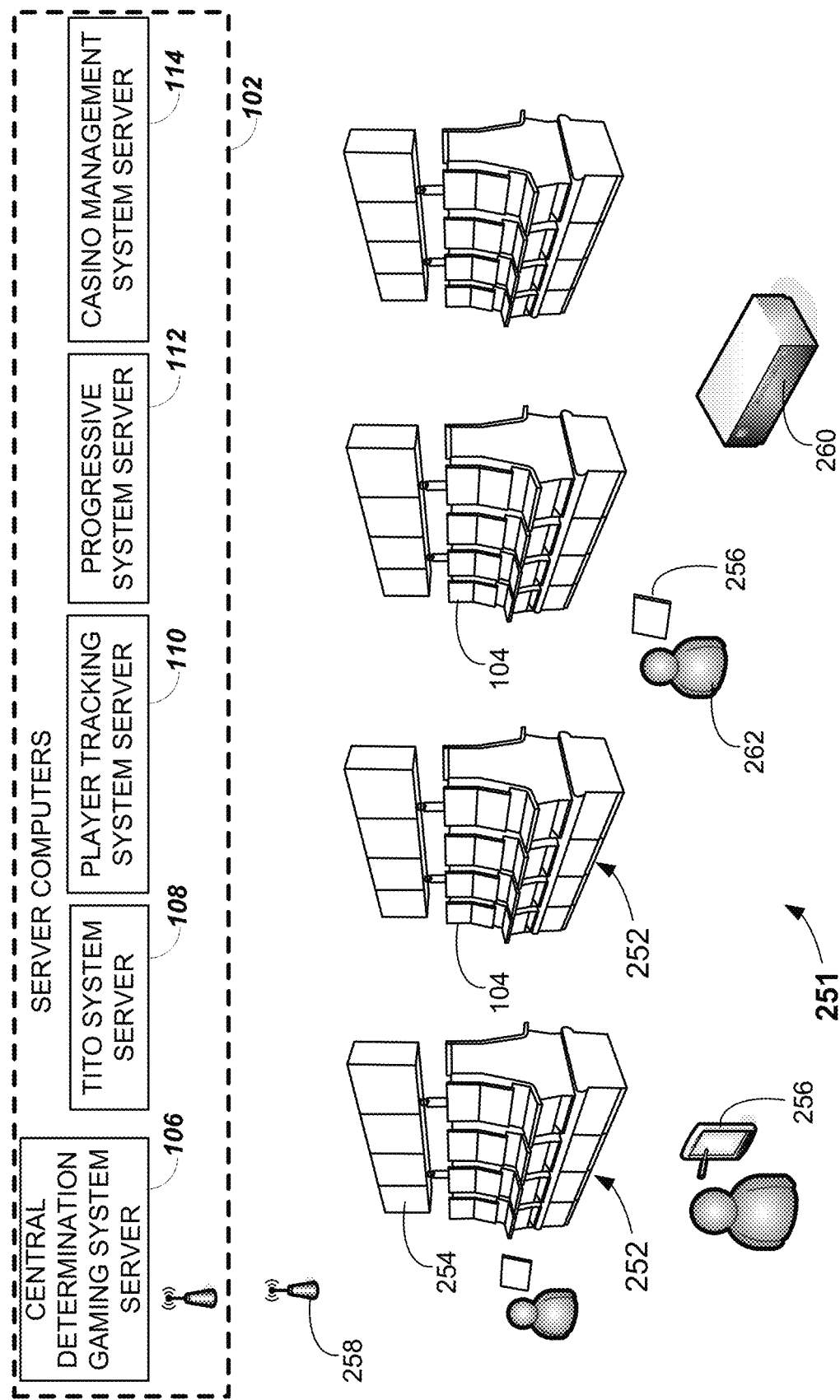
FIG. 2B depicts a casino gaming environment according to one example.

FIG. 2B depicts a casino gaming environment according to one example. In this example, the casino 251 includes banks 252 of EGMs 104. In this example, each bank 252 of EGMs 104 includes a corresponding gaming signage system 254 (also shown in FIG. 2A). According to this implementation, the casino 251 also includes mobile gaming devices 256, which are also configured to present wagering games in this example. The mobile gaming devices 256 may, for example, include tablet devices, cellular phones, smart phones and/or other handheld devices. In this example, the mobile gaming devices 256 are configured for communication with one or more other devices in the casino 251, including but not limited to one or more of the server computers 102, via wireless access points 258.

According to some examples, the mobile gaming devices 256 may be configured for stand-alone determination of game outcomes. However, in some alternative implementations the mobile gaming devices 256 may be configured to receive game outcomes from another device, such as the central determination gaming system server 106, one of the EGMs 104, etc.

Some mobile gaming devices 256 may be configured to accept monetary credits from a credit or debit card, via a wireless interface (e.g., via a wireless payment app), via tickets, via a patron casino account, etc. However, some mobile gaming devices 256 may not be configured to accept monetary credits via a credit or debit card. Some mobile gaming devices 256 may include a ticket reader and/or a ticket printer whereas some mobile gaming devices 256 may not, depending on the particular implementation.

In some implementations, the casino 251 may include one or more kiosks 260 that are configured to facilitate monetary transactions involving the mobile gaming devices 256, which may include cash out and/or cash in transactions. The kiosks 260 may be configured for wired and/or wireless communication with the mobile gaming devices 256. The kiosks 260 may be configured to accept monetary credits from casino patrons 262 and/or to dispense monetary credits to casino patrons 262 via cash, a credit or debit card, via a wireless interface (e.g., via a wireless payment app), via tickets, etc. According to some examples, the kiosks 260 may be configured to accept monetary credits from a casino patron and to provide a corresponding amount of monetary credits to a mobile gaming device 256 for wagering purposes, e.g., via a wireless link such as a near-field communications link. In some such examples, when a casino patron 262 is ready to cash out, the casino patron 262 may select a cash out option provided by a mobile gaming device 256, which may include a real button or a virtual button (e.g., a button provided via a graphical user interface) in some instances. In some such examples, the mobile gaming device 256 may send a "cash out" signal to a kiosk 260 via a wireless link in response to receiving a "cash out" indication from a casino patron. The kiosk 260 may provide monetary credits to the casino patron 262 corresponding to the "cash out" signal, which may be in the form of cash, a credit ticket, a credit transmitted to a financial account corresponding to the casino patron, etc.

In some implementations, a cash-in process and/or a cash-out process may be facilitated by the TITO system server 108. For example, the TITO system server 108 may control, or at least authorize, ticket-in and ticket-out transactions that involve a mobile gaming device 256 and/or a kiosk 260.

Some mobile gaming devices 256 may be configured for receiving and/or transmitting player loyalty information. For example, some mobile gaming devices 256 may be configured for wireless communication with the player tracking system server 110. Some mobile gaming devices 256 may be configured for receiving and/or transmitting player loyalty information via wireless communication with a patron's player loyalty card, a patron's smartphone, etc.

According to some implementations, a mobile gaming device 256 may be configured to provide safeguards that prevent the mobile gaming device 256 from being used by an unauthorized person. For example, some mobile gaming devices 256 may include one or more biometric sensors and may be configured to receive input via the biometric sensor (s) to verify the identity of an authorized patron. Some mobile gaming devices 256 may be configured to function only within a predetermined or configurable area, such as a casino gaming area.

Figure 2C:
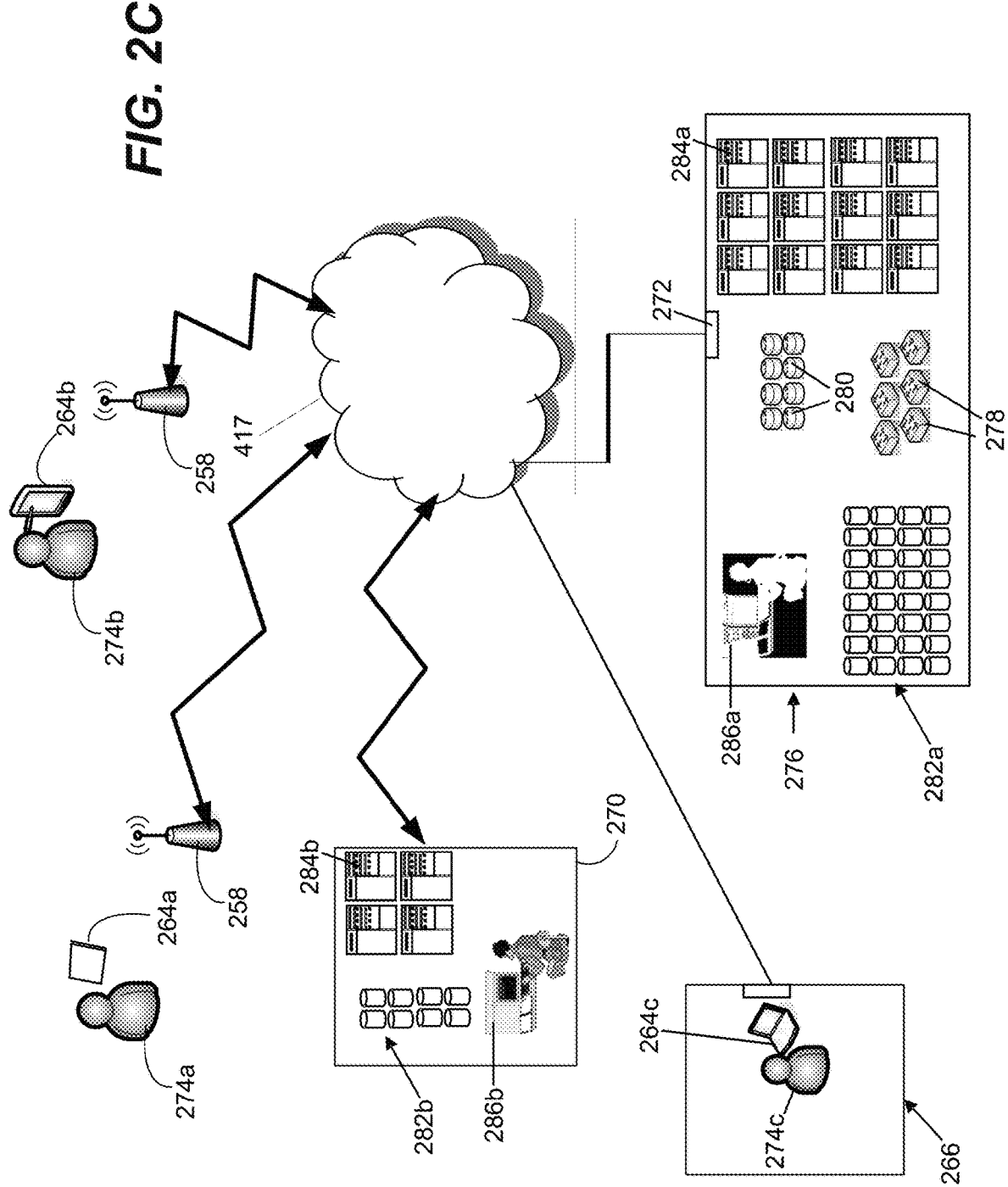
FIG. 2C is a diagram that shows examples of components of a system for providing online gaming according to some aspects of the present disclosure.

FIG. 2C is a diagram that shows examples of components of a system for providing online gaming according to some aspects of the present disclosure. As with other figures presented in this disclosure, the numbers, types and arrangements of gaming devices shown in FIG. 2C are merely shown by way of example. In this example, various gaming devices, including but not limited to end user devices (EUDs) 264a, 264b and 264c are capable of communication via one or more networks 417. The networks 417 may, for example, include one or more cellular telephone networks, the Internet, etc. In this example, the EUDs 264a and 264b are mobile devices: according to this example the EUD 264a is a tablet device and the EUD 264b is a smart phone. In this implementation, the EUD 264c is a laptop computer that is located within a residence 266 at the time depicted in FIG. 2C. Accordingly, in this example the hardware of EUDs is not specifically configured for online gaming, although each EUD is configured with software for online gaming. For example, each EUD may be configured with a web browser. Other implementations may include other types of EUD, some of which may be specifically configured for online gaming.

In this example, a gaming data center 276 includes various devices that are configured to provide online wagering games via the networks 417. The gaming data center 276 is capable of communication with the networks 417 via the gateway 272. In this example, switches 278 and routers 280 are configured to provide network connectivity for devices of the gaming data center 276, including storage devices 282a, servers 284a and one or more workstations 570a. The servers 284a may, for example, be configured to provide access to a library of games for online game play. In some examples, code for executing at least some of the games may initially be stored on one or more of the storage devices 282a. The code may be subsequently loaded onto a server 284a after selection by a player via an EUD and communication of that selection from the EUD via the networks 417. The server 284a onto which code for the selected game has been loaded may provide the game according to selections made by a player and indicated via the player's EUD. In other examples, code for executing at least some of the games may initially be stored on one or more of the servers 284a. Although only one gaming data center 276 is shown in FIG. 2C, some implementations may include multiple gaming data centers 276.

In this example, a financial institution data center 270 is also configured for communication via the networks 417. Here, the financial institution data center 270 includes servers 284b, storage devices 282b, and one or more workstations 286b. According to this example, the financial institution data center 270 is configured to maintain financial accounts, such as checking accounts, savings accounts, loan accounts, etc. In some implementations one or more of the authorized users 274a-274c may maintain at least one financial account with the financial institution that is serviced via the financial institution data center 270.

According to some implementations, the gaming data center 276 may be configured to provide online wagering games in which money may be won or lost. According to some such implementations, one or more of the servers 284a may be configured to monitor player credit balances, which may be expressed in game credits, in currency units, or in any other appropriate manner. In some implementations, the server(s) 284a may be configured to obtain financial credits from and/or provide financial credits to one or more financial institutions, according to a player's "cash in" selections, wagering game results and a player's "cash out" instructions. According to some such implementations, the server (s) 284a may be configured to electronically credit or debit the account of a player that is maintained by a financial institution, e.g., an account that is maintained via the financial institution data center 270. The server(s) 284a may, in some examples, be configured to maintain an audit record of such transactions.

In some alternative implementations, the gaming data center 276 may be configured to provide online wagering games for which credits may not be exchanged for cash or the equivalent. In some such examples, players may purchase game credits for online game play, but may not "cash out" for monetary credit after a gaming session. Moreover, although the financial institution data center 270 and the gaming data center 276 include their own servers and storage devices in this example, in some examples the financial institution data center 270 and/or the gaming data center 276 may use offsite "cloud-based" servers and/or storage devices. In some alternative examples, the financial institution data center 270 and/or the gaming data center 276 may rely entirely on cloud-based servers.

One or more types of devices in the gaming data center 276 (or elsewhere) may be capable of executing middleware, e.g., for data management and/or device communication. Authentication information, player tracking information, etc., including but not limited to information obtained by EUDs 264 and/or other information regarding authorized users of EUDs 264 (including but not limited to the authorized users 274a-274c), may be stored on storage devices 282 and/or servers 284. Other game-related information and/or software, such as information and/or software relating to leaderboards, players currently playing a game, game themes, game-related promotions, game competitions, etc., also may be stored on storage devices 282 and/or servers 284. In some implementations, some such game-related software may be available as "apps" and may be downloadable (e.g., from the gaming data center 276) by authorized users.

In some examples, authorized users and/or entities (such as representatives of gaming regulatory authorities) may obtain gaming-related information via the gaming data center 276. One or more other devices (such EUDs 264 or devices of the gaming data center 276) may act as intermediaries for such data feeds. Such devices may, for example, be capable of applying data filtering algorithms, executing data summary and/or analysis software, etc. In some implementations, data filtering, summary and/or analysis software may be available as "apps" and downloadable by authorized users.

Figure 3:
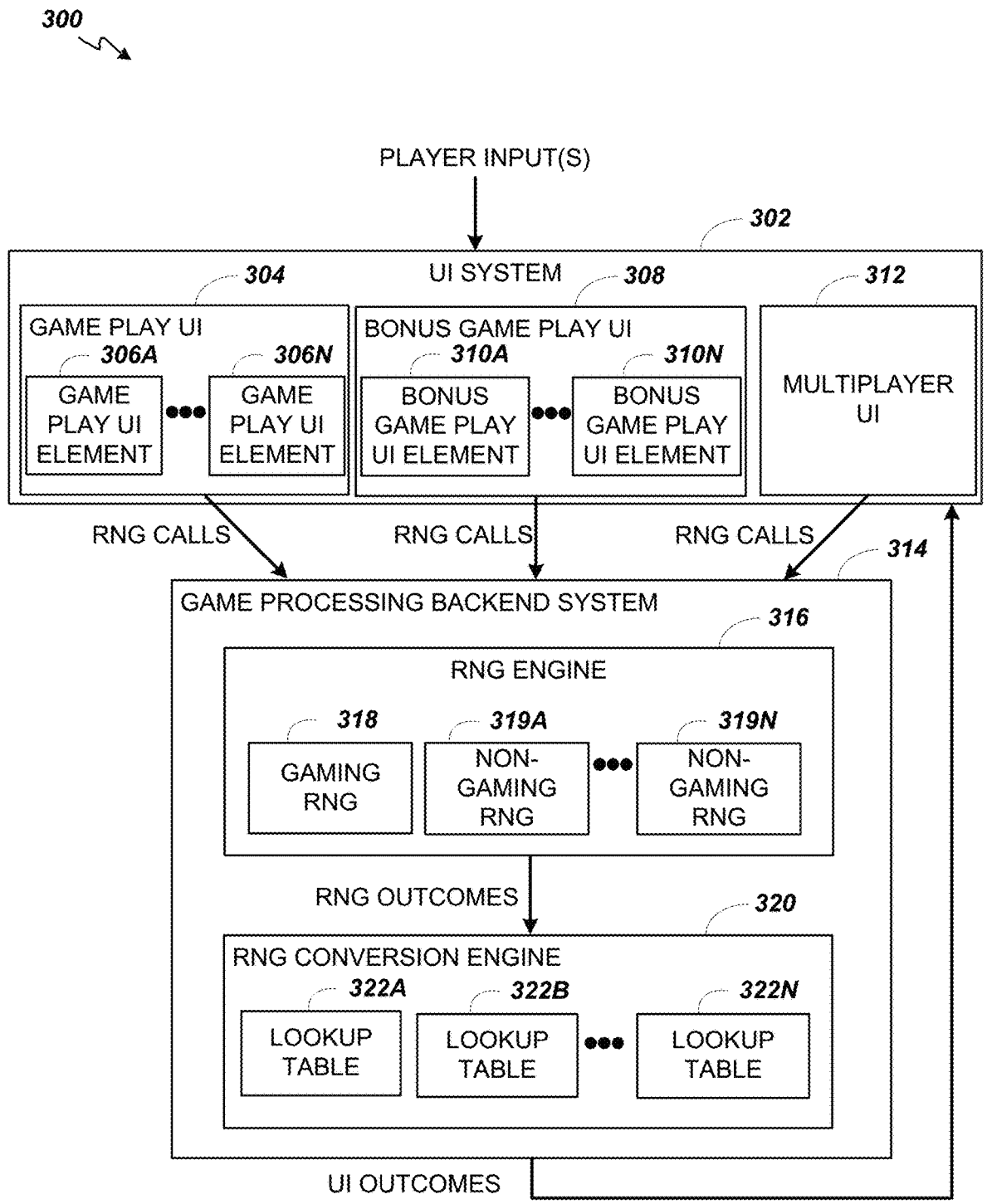
FIG. 3 illustrates, in block diagram form, an implementation of a game processing architecture algorithm that implements a game processing pipeline for the play of a game in accordance with various implementations described herein.

FIG. 3 illustrates, in block diagram form, an implementation of a game processing architecture 300 that implements a game processing pipeline for the play of a game in accordance with various implementations described herein. As shown in FIG. 3, the gaming processing pipeline starts with having a UI system 302 receive one or more player inputs for the game instance. Based on the player input(s), the UI system 302 generates and sends one or more RNG calls to a game processing backend system 314. Game processing backend system 314 then processes the RNG calls with RNG engine 316 to generate one or more RNG outcomes. The RNG outcomes are then sent to the RNG conversion engine 320 to generate one or more game outcomes for the UI system 302 to display to a player. The game processing architecture 300 can implement the game processing pipeline using a gaming device, such as gaming devices 104A-104X and 200 shown in FIGS. 1 and 2, respectively. Alternatively, portions of the gaming processing architecture 300 can implement the game processing pipeline using a gaming device and one or more remote gaming devices, such as central determination gaming system server 106 shown in FIG. 1.

The UI system 302 includes one or more UIs that a player can interact with. The UI system 302 could include one or more game play UIs 304, one or more bonus game play UIs 308, and one or more multiplayer UIs 312, where each UI type includes one or more mechanical UIs and/or graphical UIs (GUIs). In other words, game play UI 304, bonus game play UI 308, and the multiplayer UI 312 may utilize a variety of UI elements, such as mechanical UI elements (e.g., physical "spin" button or mechanical reels) and/or GUI elements (e.g., virtual reels shown on a video display or a virtual button deck) to receive player inputs and/or present game play to a player. Using FIG. 3 as an example, the different UI elements are shown as game play UI elements 306A-306N and bonus game play UI elements 310A-310N.

The game play UI 304 represents a UI that a player typically interfaces with for a base game. During a game instance of a base game, the game play UI elements 306A-306N (e.g., GUI elements depicting one or more virtual reels) are shown and/or made available to a user. In a subsequent game instance, the UI system 302 could transition out of the base game to one or more bonus games. The bonus game play UI 308 represents a UI that utilizes bonus game play UI elements 310A-310N for a player to interact with and/or view during a bonus game. In one or more implementations, at least some of the game play UI element 306A-306N are similar to the bonus game play UI elements 310A-310N. In other implementations, the game play UI element 306A-306N can differ from the bonus game play UI elements 310A-310N.

FIG. 3 also illustrates that UI system 302 could include a multiplayer UI 312 purposed for game play that differs or is separate from the typical base game. For example, multiplayer UI 312 could be set up to receive player inputs and/or presents game play information relating to a tournament mode. When a gaming device transitions from a primary game mode that presents the base game to a tournament mode, a single gaming device is linked and synchronized to other gaming devices to generate a tournament outcome. For example, multiple RNG engines 316 corresponding to each gaming device could be collectively linked to determine a tournament outcome. To enhance a player's gaming experience, tournament mode can modify and synchronize sound, music, reel spin speed, and/or other operations of the gaming devices according to the tournament game play. After tournament game play ends, operators can switch back the gaming device from tournament mode to a primary game mode to present the base game. Although FIG. 3 does not explicitly depict that multiplayer UI 312 includes UI elements, multiplayer UI 312 could also include one or more multiplayer UI elements.

Based on the player inputs, the UI system 302 could generate RNG calls to a game processing backend system 314. As an example, the UI system 302 could use one or more application programming interfaces (APIs) to generate the RNG calls. To process the RNG calls, the RNG engine 316 could utilize gaming RNG 318 and/or non-gaming RNGs 319A-319N. Gaming RNG 318 could corresponds to RNG 212 or hardware RNG 244 shown in FIG. 2A. As previously discussed with reference to FIG. 2A, gaming RNG 318 often performs specialized and non-generic operations that comply with regulatory and/or game requirements. For example, because of regulation requirements, gaming RNG 318 could correspond to RNG 212 by being a cryptographic RNG or pseudorandom number generator (PRNG) (e.g., Fortuna PRNG) that securely produces random numbers for one or more game features. To securely generate random numbers, gaming RNG 318 could collect random data from various sources of entropy, such as from an operating system (OS) and/or a hardware RNG (e.g., hardware RNG 244 shown in FIG. 2A). Alternatively, non-gaming RNGs 319A-319N may not be cryptographically secure and/or be computationally less expensive. Non-gaming RNGs 319A-319N can, thus, be used to generate outcomes for non-gaming purposes. As an example, non-gaming RNGs 319A-319N can generate random numbers for generating random messages that appear on the gaming device.

The RNG conversion engine 320 processes each RNG outcome from RNG engine 316 and converts the RNG outcome to a UI outcome that is feedback to the UI system 302. With reference to FIG. 2A, RNG conversion engine 320 corresponds to RNG conversion engine 210 used for game play. As previously described, RNG conversion engine 320 translates the RNG outcome from the RNG 212 to a game outcome presented to a player. RNG conversion engine 320 utilizes one or more lookup tables 322A-322N to regulate a prize payout amount for each RNG outcome and how often the gaming device pays out the derived prize payout amounts. In one example, the RNG conversion engine 320 could utilize one lookup table to map the RNG outcome to a game outcome displayed to a player and a second lookup table as a pay table for determining the prize payout amount for each game outcome. In this example, the mapping between the RNG outcome and the game outcome controls the frequency in hitting certain prize payout amounts. Different lookup tables could be utilized depending on the different game modes, for example, a base game versus a bonus game.

After generating the UI outcome, the game processing backend system 314 sends the UI outcome to the UI system 302. Examples of UI outcomes are symbols to display on a video reel or reel stops for a mechanical reel. In one example, if the UI outcome is for a base game, the UI system 302 updates one or more game play UI elements 306A-306N, such as symbols, for the game play UI 304. In another example, if the UI outcome is for a bonus game, the UI system could update one or more bonus game play UI elements 310A-310N (e.g., symbols) for the bonus game play UI 308. In response to updating the appropriate UI, the player may subsequently provide additional player inputs to initiate a subsequent game instance that progresses through the game processing pipeline.

Figure 4:
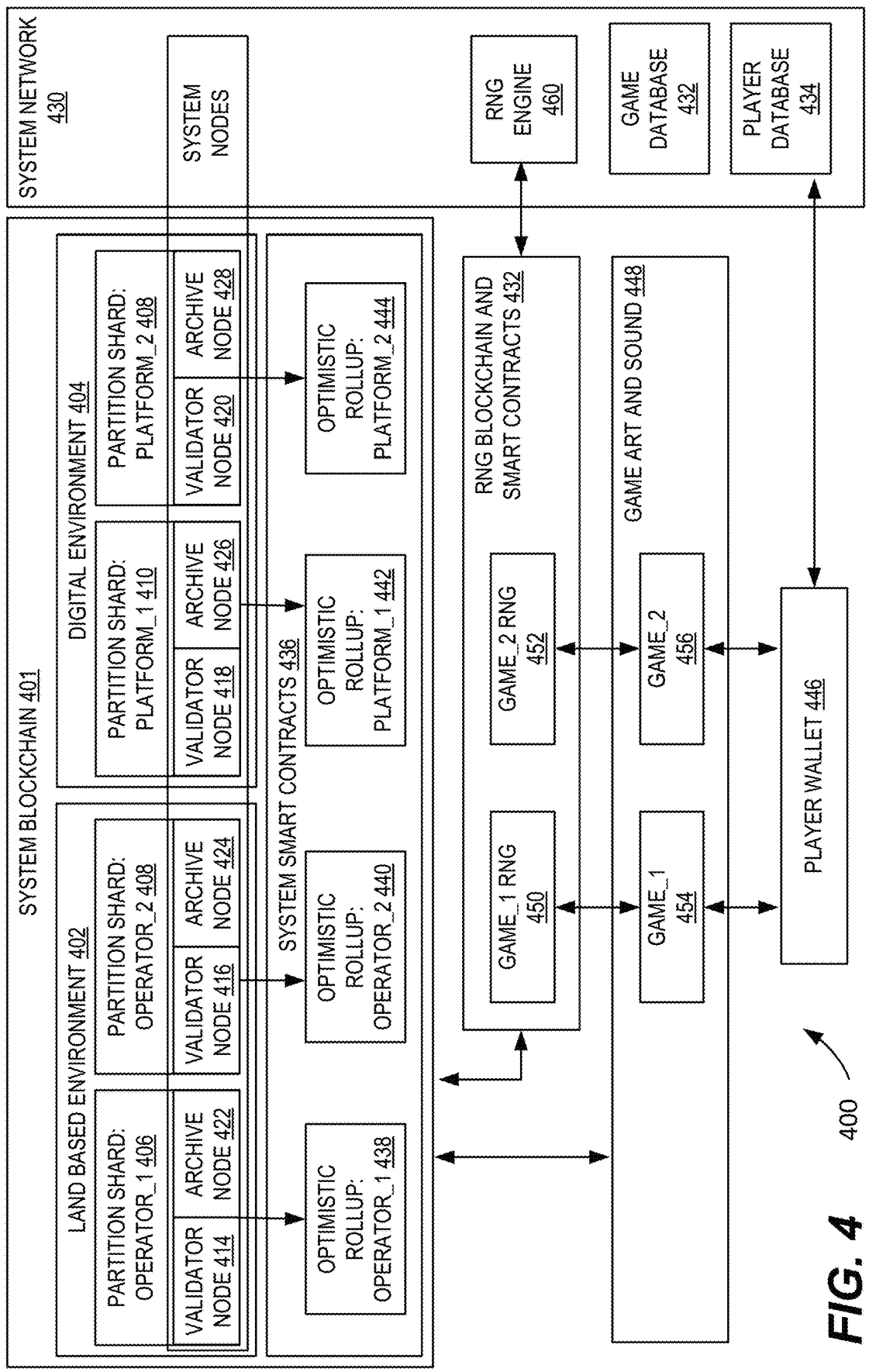
FIG. 4 is an example environment for the tokenization of digital assets associated with electronic gaming, as described herein.

FIG. 4 is an example blockchain system 400 for the tokenization of digital assets associated with electronic gaming, as described herein.

In the example shown in FIG. 4, blockchain system 400 includes a system blockchain 401. System blockchain 401 includes a land-based environment 402 that supports land-based electronic gaming devices such as EGMs 104 (shown in FIG. 1) and a digital environment 404 that supports digital gaming (e.g., online or mobile real-money or social gaming). Environment 402 includes example land-based casinos 406, 408 (illustrated in FIG. 4 as partition shards for "Operator_1" and "Operator_2"). Environment 404 includes example digital environments 410, 412 (e.g., mobile applications) (illustrated in FIG. 4 as partition shards for "Platform_1" and "Platform_2"). In the example embodiment, each of casinos 406, 408 and environments/apps 410, 412 are associated with a shard and/or partition in system blockchain 401. Further, each of casinos 406, 408 and environments/apps 410, 412 is associated with a validator node 414-420 and an archive node 422-428. Validator nodes 414-420 and archive nodes 422-428 are associated with a gaming entity network 430 (e.g., of the "owner" or "manager" of the blockchain system 400).

In some embodiments, validator nodes 414-420 are configured to store blockchain data (e.g., associated with system blockchain 401 and/or a specific shard 406-412). Nodes 414-420 participate in block validation, and verify all blocks and states in system blockchain 401. States (e.g., verifiable random function (VRF) proofs, price states, and/or any other states) may be derived from nodes 414-420. Further, nodes 414-420 serve network 430 by, as an example, providing data on system blockchain 401 requested by network 430.

In some embodiments, nodes 414-420 may be configured to be used with relatively low processing capacity devices (e.g., mobile phones, embedded devices, etc., that may not be capable of storing gigabytes of blockchain data). For example, nodes 414-420 may only store a header chain (e.g., block headers for blocks in system blockchain 401) and may request all other data from system blockchain 401. Nodes 414-420 may then verify the validity of received data against state roots in the stored block headers.

In some embodiments, archive nodes 422-428 are configured to store all data stored in full nodes in system blockchain 401 and build an archive of historical states of the full nodes in the system blockchain 401. Nodes 422-428 generating an archive is useful to, for example, query a prior account balance stored at a particular block. The data stored in nodes 422-428 may represent terabytes of data in order to be useful for a variety of services (e.g., generating blockchain analytics, etc.) and/or service providers (e.g., block explorers, wallet vendors, etc.) associated with blockchain 401.

Gaming entity network 430 further includes game database 432 (e.g., storing game code, assets, art, sound, pay tables, backend math in game RNGs 450, 452 for example electronic games) and a player database 434 (e.g., associated with server 110). Blockchain 401 also includes system smart contracts 436 including a layer 438-444 associated with each of casinos 406, 408 and environments/apps 410, 412.

The blockchain system 400 also includes a wallet database 446 in communication with player database 434 (e.g., storing player wallet data). The blockchain system 400 further includes an electronic game database 448 (e.g., storing audio and visual settings for example electronic games 454, 456).

In the example embodiment, the system blockchain 401 utilizes electronic gaming tokens (EGTs) as partially fungible tokens (PFTs) ("tokens") as described herein. Token partitions may follow gaming entity standards. As examples, an "A" standard may be associated with a base currency. The base currency may be received when a player trades from an exchange or purchases directly from a gaming entity (e.g., and is what allows players to enjoy the gaming entity's service). A "D" standard may be associated with player rewards for digital gaming, functioning as a security token (e.g., it can be used for digital gaming but cannot be used for trading). An "L" standard may be associated with security tokens for tertiary recipients (e.g., gaming rewards that are sent to a charity of the player's choice).

As further examples, the above standards/partitions may be further partitioned (e.g., each mobile environment 410, 412 and/or casino 406, 408 may have its own partition tailored for its own use).

One goal of utilizing the system blockchain 401 across casinos 406, 408 and mobile environments 410, 412 alike is to have currency types that support various types of gaming across various operators and use cases (e.g., land-based or mobile) and will encourage players to use bought or earned digital assets they're not interested in using with one area, across multiple areas. Further, minimizing digital assets not in circulation by increasing player content engagement will increase advertisement engagement, and thus more ad revenue. For example, a player may win a grand jackpot in one mobile application (e.g., 410) and may use the winnings to get cosmetic upgrades to a character in another mobile application (e.g., 412). In some embodiments, players may use EGTs in both mobile and land-based environments (e.g., 406-412). Further, by creating casino specific wallets (e.g., for casinos 406, 408), each wallet can be allowed access to (e.g., whitelisted) to multiple "D" standard tokens, and thus players can use tokens interchangeably across the specific casinos and/or mobile applications.

In some embodiments, the system blockchain 401 may utilize proof of work (PoW) sustainability. Some cryptocurrencies rely on PoW to make ledgers secure. A PoW is a random string of data such that when summed with the contents of a block and passed through a cryptographic hash function, outputs a string with its first X number of digits equal to zero, X being algorithmically determined based on the amount of miners on the network such that finding a proof takes approximately ten minutes. With this model, security is paid with work (e.g., energy).

In some embodiments, system blockchain 401 may utilize proof of stake (POS) sustainability. With PoS, members of the network (e.g., users with devices connected to the network) have the opportunity to basically vow to the integrity of the network, and they back this vow with a large quantity of tokens called stake. This is done by creating what is called a node. When creating a node, it must commit to being online and ready to perform a PoS if randomly selected within a contracted fixed period (e.g., six months). During this time stake cannot be accessed. A node listens for broadcasted transactions and writes them to the general ledger. It then reconciles all block transactions and validates the block with a number of preceding blocks. A block validating node is called a validator (e.g., 414-420). If another node finds fault in that block, the node at fault's stake is lost to balance the ledger. Furthermore, the node loses reputation. Reputation is a metric of how reliable a node is. The more reliable, the better reputation, and the more likely the node is chosen to do a block validation. If a node successfully validates a block, that node gets a reward.

A POS node does not need to perform thousands of hash functions per second, validating a node can simply be done with a mobile phone. Replacing energy-costly POW with POS may massively reduce global energy consumption. Accordingly, PoS embodiments may be preferred with system blockchain 401.

Prior to implementation, it is commonplace for token creators to put a percentage of token supply into circulation, to attract investors and the public to build validators. A small percentage of token supply, may be 10-20%, may be reserved for gifting to gaming entity partners as stake, for the purpose of building nodes. These partners could be land-based operators such as casinos.

In some embodiments, the system blockchain 401 may be publicly accessible (e.g., land-based EGMs being adapted to link to player wallets). In some embodiments, an operator wallet (e.g., stored in database 446) may be a downloadable app on a player phone, and function as: a) an operator-exclusive wallet; b) fiat currency (e.g., legal tender whose value is tied to a government-issued currency) to EGT and EGT to fiat market rate exchange; and c) proof of identity. In the example embodiment, players prove their identity first before using the wallet, then can buy EGTs (tokens that can only be used for gaming), win "A" tokens on land based games, and win "D" tokens on digital games. An example interface may show an account balance, and a point of sale. Accordingly, database 446 is a private secure database of wallet IDs and players proof of identity.

Further, if a game (e.g., at an EGM or mobile device) crashes after a game is purchased but before the game result is revealed, the game result must be recoverable. Accordingly, the EGT price must also be recoverable. To resolve this, player wallet and smart-bridge price states may be saved to the ledger before gameplay.

One issue with PoW, and potentially POS as well can be slow transaction speeds. Players don't want to have to wait for long periods of time between games. One solution to this problem may be a Directed Acyclic Graphology (DAG) Side-chain. DAG is a faster transaction method. As opposed to a single node validating one block at a time, multiple nodes work in parallel, validating multiple transactions as they're made with a very small PoS operation.

It cannot support large transfers as a node's stake is split to maximize transaction bandwidth, making it ideal for many small transactions. The DAG works in parallel with the main-chain in what is called a side-chain allowing users to securely move funds between them with higher transaction speeds. DAG can also be used to validate multiple distinct blockchain blocks simultaneously.

An alternative to DAG is the concept of sharding and optimistic rollups, that together could theoretically support 100,000 transactions per second (tx/s). Sharding is where the main-chain is broken up from one chain into multiple smaller chains enabling validators (e.g., 414-420) to validate multiple chains simultaneously. Sharding works to store data, meaning transactions and smart contracts may need to be executed on a separate layer (e.g., system smart contracts 436).

Optimistic rollups are a type of layer solution that may not work on the main-chain, but instead above it (e.g., on a different layer). This enables transactions and smart contracts to execute en mass while still being secured by the sharding PoS. It works by an aggregator taking smart contracts off chain, aggregating them and creating a new smart contract, merkle root (proof), and transaction on the shard. Any aggregator can challenge an aggregators' merkle proof, and if invalid, the fraudulent one loses a part of their stake, and the new one claims those rewards.

In other words, transactions performed on optimistic rollups 438-444 may be stored/aggregated in at least one smart-contract where users deposit funds, aggregators sign up, and fraud proofs are committed, as examples. As an example of utilization of rollups 438-444, a user may deploy transaction of a smart contract off of system blockchain 401 to an aggregator (e.g., a block producer). The aggregator may then deploy the transaction, thus creating a new smart contract. The aggregator then computes a new state root (e.g., a merkle root) and creates a transaction that contains the computed new state root. Any user that sees an aggregator deploying an invalid state root (e.g., a state root created by including invalid transactions) may then challenge that aggregator by posting a valid state root along with the associated merkle proofs. The user may then slash (e.g., remove data created by the aggregator) the generated fraudulent root (e.g., and any blocks built stemming from/on top of the root) and claim rewards/benefits/stake while the fraudulent aggregator loses their stake. Then, after an invalid/fraudulent block has been identified and a fraud proof is finalized, the portion of system blockchain 401 including the fraudulent block can be rolled back and resume from the previous non-fraudulent block.

An important part of PoS integrity is node reputation. Game-manufacturer owned nodes with high reputation means the game manufacturer has not forged the ledger, and with node and stake ownership distributed between a game manufacturer, game manufacturer partners, and the public, all three sectors keep each other honest.

DAG uses a small PoS to work. This need can be filled by player wallets, whereby with each transaction for EGT, a percentage of EGT must be staked on their player wallet node. Players can't then spend staked tokens lest they lose reputation. This accomplishes: a) rewarding players for not emptying the contents of their wallet; and b) penalizing players before spending beyond their means. How much a player can then bet is a function of their wallet node stake, and reputation.

Further, a game manufacturer having its own general ledger that handles cash flow directly with the end user eliminates double handling, and the need for middleman companies. A public general ledger also invites scrutiny, and validates claims to the game manufacturer holding itself to rigorous standards of integrity, while also promoting anti-money laundering.

If an electronic game crashes after the game is purchased but before the game result is revealed to the player, the game result must be recoverable. Having the game result as an outcome resolved by a smart contract ensures that once the smart contract is resolved, the game outcome is immutable. A solution to this problem includes utilization of game RNGs 450, 452 serving as an online database 432.

When calling a function on a smart contract, the function is broadcasted to a node or nodes 414-428 on network 430 as a transaction. Nodes 414-428 on the network then collect transactions, and publish them as a block to the rest of network 430. Once a node 414-428 has verified that the other node's list of transactions are valid, it then accepts the block and moves on to validating the next block. This makes the random number function exploitable.

Given, for example, a coin flip contract whereby heads doubles the bet, and tails the bet is lost, a random function is used to determine heads or tails (e.g., random >=50 is heads, random <50 is tails). If a node 414-428 could publish a transaction only to itself and not share it, node 414-428 could then run the coin flip function to see if the outcome is a win or loss, and choose not to include that transaction in the next block it's validating. Node 414-428 could repeat this process indefinitely until it finally won the coin flip and solved the next block, and profit.

With the addition of a second smart contract in the transaction process, the game outcome and the relevant payout quantity must be resolved. Accordingly, game RNG outcomes may first be generated off-chain, and then brought on-chain.

By making a request within the smart contract to game RNGs 450, 452 to generate a Verifiable Random Function (VRF), an RNG outcome may be generated off chain (e.g., off of the system blockchain 401). The function takes a seed, and outputs a provably random number. VRF can be used for generating random numbers for any game, where any outcome is the modulus by a game's total possible outcomes of the VRF output. For example, for each spin of a reel game a request is made with a seed (e.g., where the seed is a hash function of collected random data from various sources of entropy).

By having the RNG outcome be verifiable, the VRF proof can be validated with the transaction, preventing game RNGs 450, 452 from faking game outcomes (e.g., as explained above with respect to repeating a coin flip until a winning outcome is achieved). Its use must be restricted for users with a wallet IDs that have been verified off chain (e.g., via a know your customer (KYC) check). This verification is to prevent attacks (e.g., Sybil attacks), where a malevolent actor can subvert the reputation system of a game RNG by creating a large number of identities and gain a dispropor-tionally large influence over the network. These attacks may also be mitigated by incurring an economic cost, for example a player wishing to use the system without KYC can opt to pay a fee per transaction, effectively lowering the efficacy of their bet and by extension reducing their RTP.

In some embodiments, to avoid being labelled an operator, these fees may not be paid to operated nodes, and therefore these transactions may be validated by public nodes. Another alternative for land-based games is Personhood Validation, which is to enforce a one-to-one correspondence between online identities and real-world users. This could be done by creating temporary paper wallets with a 24 hour cooldown, issued by casino kiosks for players to use. However, this method may include the security risk of enabling casinos to perform Sybil attacks.

FIGS. 5A-9 illustrate an example implementation of a blockchain system 500 for integrated transaction operations between a system owner (or just "owner"), multiple operators (e.g., casinos), and their various players using partially fungible tokens ("PFTs"). A PFT is a non-fungible token ("NFT") with the functionality to enable a token to be fungible with another token. In some embodiments, the blockchain system 500 of FIGS. 5A-9 may be similar to the blockchain system 400 shown in FIG. 4. The term "operator" and "casino" may be used interchangeably herein. In this example embodiment, a "coin" is a store of value on a blockchain ledger, a smart contract (or just "contract") is a set of instructions and conditions defining a use of a coin, and a token is a coin with a use defined by the contract(s). In this example embodiment, value is traded between these three parties via token exchange within the blockchain system 500 (e.g., on the system blockchain 401), with conditions set on token use via the blockchain (e.g., via system smart contracts 436). Players exchange currency for tokens. Players then give tokens to casinos (e.g., via land-based or mobile gaming), with casinos giving back a percentage based on the return to player ("RTP") set (e.g., by the casinos) for each of the particular games. Under this model, the casinos typically accumulate tokens on the blockchain as players play their various games. If casinos and players are able to trade tokens freely, the accumulated tokens may grant influence over the market and may lead to token price manipulation, favoring the casino and disparaging the player. Accordingly, the owner acts as a central exchange ("CEX"), functioning as a middleman between casinos and players, where players can buy, sell, and use tokens, and casinos can sell tokens.

Figure 5A:
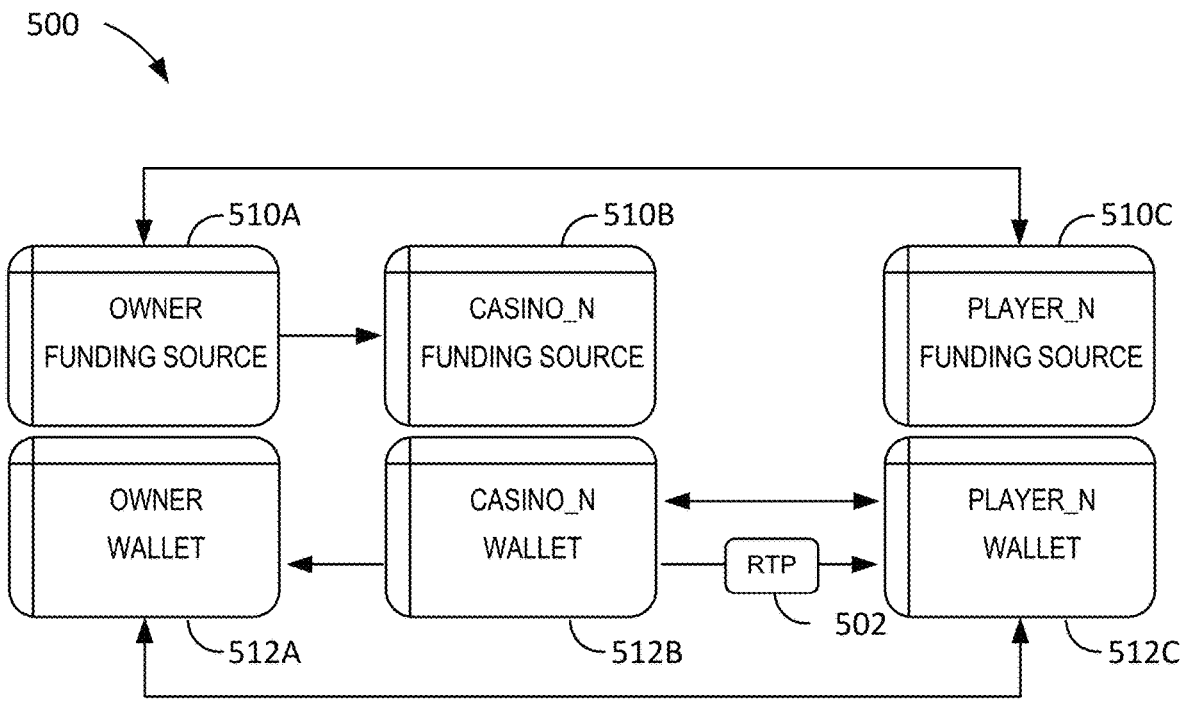
FIG. 5A and FIG. 5B illustrate various exchanges between an owner, casinos, and players during use of the blockchain system.
Figure 5B:
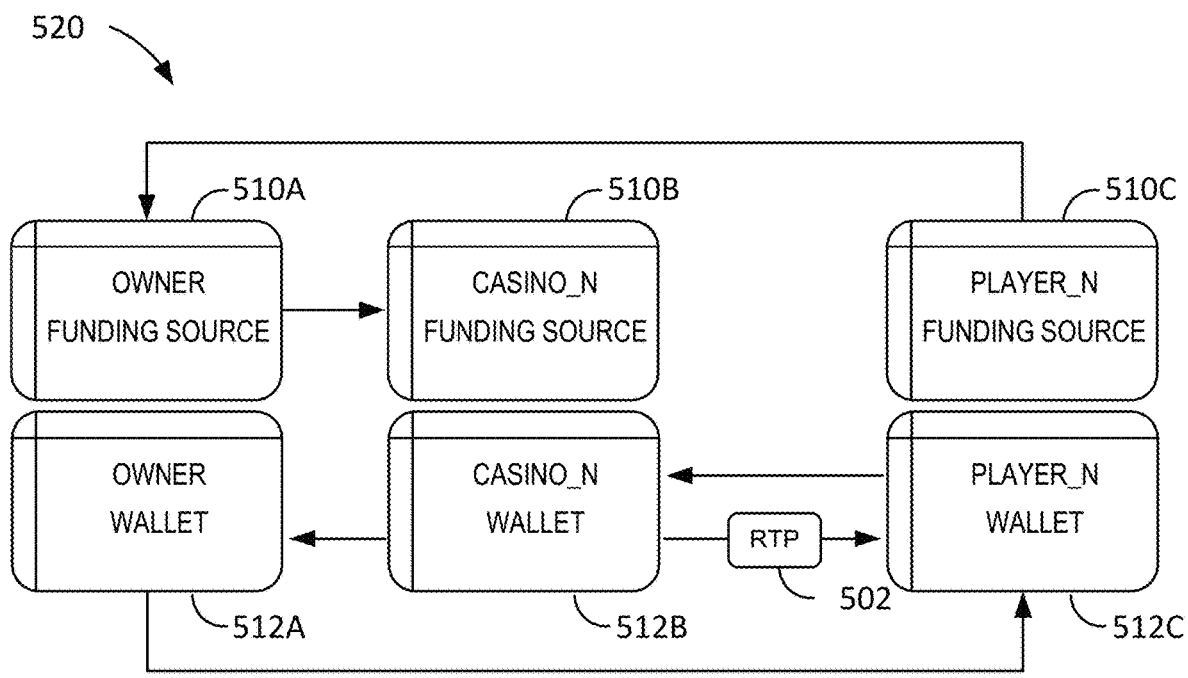

FIG. 5A and FIG. 5B illustrate various exchanges between an owner, casinos, and players during use of the blockchain system 500. FIG. 5A illustrates real money exchanges between the three parties, where FIG. 5B illustrates "fake" money exchanges, with arrows defining direction of exchanges (e.g., transactions on the blockchain or transactions between off-chain accounts of the parties). In the example embodiment, funding sources 510 represent any store of currency (e.g., bank accounts, credit or debit accounts, or the like). Wallets 512 represent accounts for the various parties on the blockchain. A wallet 512 includes a public/private key pair that is associated with an individual account on the blockchain, where the "address" of a particular wallet 512 is the public key of the wallet. For this use, token transactions are written as a public address, token ID, and quantity tuple. The private and public key generate a proof authorizing amendments to the ledger for that associated public key.

As shown in FIG. 5A and FIG. 5B, an owner of the example blockchain system 500 has owner funding sources ("FSs") 510A and owner wallet(s) 512A. The owner FS 510A can perform off-blockchain real money transactions to or from player FSs 510C (e.g., during token purchases or redemption of tokens between the players and the owner). Such real money transactions also include a corresponding, complementary exchange of those tokens between the parties via on-chain transactions between the owner wallet 512A and player wallet 512C.

During game play, a particular player may have the purchased tokens in their player wallet 512C and may use those tokens to facilitate game play via on-chain transactions. For example, when a "bet" transaction involves token value (e.g., in a bet amount) being transferred from the player wallet 512C of the player to a casino wallet 512B of the particular casino on the blockchain. Awards returned to the player, represented here by RTP 502, are "award" transactions transferring tokens from the casino wallet 512B back to the player wallet 512C (e.g., in an award amount) on the blockchain.

As casinos accumulate tokens, the owner and casinos can similarly exchange tokens for real money. For example, in a "redemption" transaction, tokens are transferred from the casino wallet 512B to the owner wallet 512A in exchange for real money in a transaction from the owner FS 510A to a casino FS 510B. Notably, in the "fake" money embodiments of FIG. 5B, while the player purchases the virtual currency (e.g., "fake" money tokens) using their player FS 510C, those tokens are only used by the player to play the games, and are not redeemable (e.g., to the owner or to the casinos) for real money. As such, no token transfer occurs from the player wallets 512C back to the owner wallet 512A. By disabling the ability of players to sell tokens on the exchange, no demand for the tokens is created. The only use for the token is to trade it to casinos for game play (e.g., RTP 502). Such is the design principle for certain digital casino games, when gambling for "real" money is unlawful.

Figure 6:
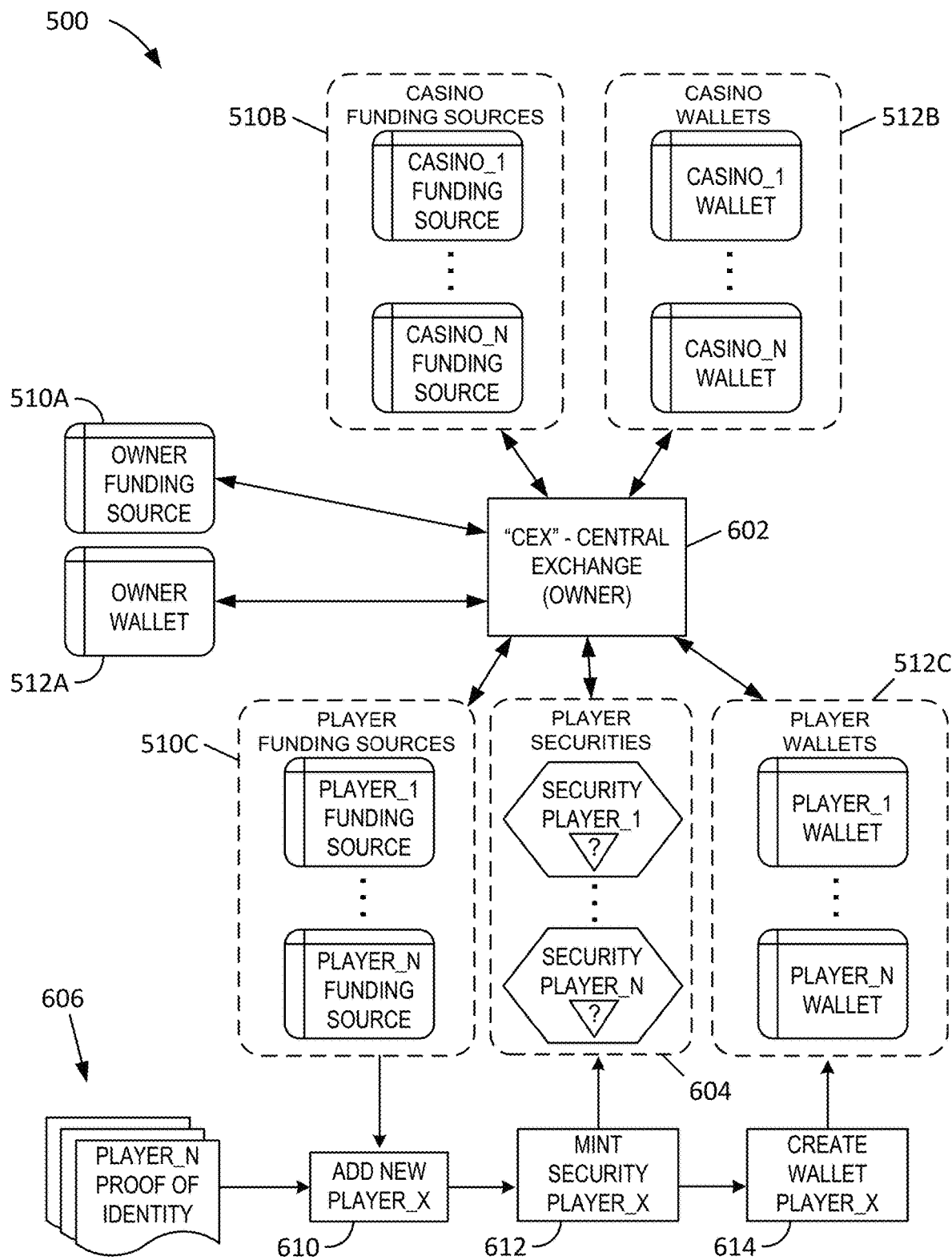
FIG. 6 illustrates aspects of a central exchange ("CEX") provided by the owner in the blockchain system.

FIG. 6 illustrates aspects of a central exchange ("CEX") 602 provided by the owner in the blockchain system 500. The CEX 602 may include one or more computing devices (not separately shown), some or all of which may participate in the blockchains provided by the blockchain system 500 (e.g., the system blockchain 401 and/or the RNG blockchain 432 of FIG. 4, and the system network 430). The CEX 602 manages the owner FSs 510A and the owner wallet 512A, and performs various on-chain and off-chain transactions, interactions, and process steps with the casinos (e.g., via the casino FSs 510B and casino wallets 512B) and the players (e.g., via the player FSs 510C and player wallets 512C), such as the transactions described in FIG. 5A and FIG. 5B. For example, the CEX 602 may initiate on-chain transactions such as the transfer of tokens from the owner wallet 512A to or from the player wallets 512C or casino wallets 512B, as well as initiating the complementary off-chain, real money transactions between the owner FSs 510A and the player FSs 510C or casino FSs 510B.

In addition, FIG. 6 also illustrates a process for adding a new player, "Player_X", to the blockchain system 500. In the example embodiment, the CEX 602 authenticates player identities for the various players or otherwise stores proofs of player identities (or "POI") 606 (e.g., data that may be used to authenticate players). At operation 610, the CEX 602 adds a new player, "Player_X", to the blockchain system 500. This may include identifying, and perhaps authenticating the player and one or more player FSs 510C for the new player. This may also include managing a private, off-chain record of players and public addresses (e.g., in the player database 434 of FIG. 4).

At operation 610, in the example embodiment, the CEX 602 creates (e.g., "mints") a player security token 604 for the new player (e.g., on the system blockchain 401). Security tokens, or just "securities", are tokens that enables functionality within a contract. Numerous functions within the blockchain system 500 are disabled by default for all but the owner (e.g., the CEX 602), but certain functionalities may be enabled for certain other participating parties in the blockchain system (e.g., for casinos or players) using security tokens. Here, a player security token 604 is created for each player. A player security 604 ensures that casinos and the owner known their customers, which helps inhibit malicious activities that may jeopardize the network, such as callToTransfer spamming, without having to resort to increasing transaction fees. The player security token 604 is a single tokenID issued to multiple addresses.

At operation 614, the CEX 602 creates a player wallet 512C for the new player. Creation of this player wallet 512C may include creating the public/private key pair associated with the wallet, or allowing a player device (e.g., a mobile device of the player) to create the public/private key pair and share the public key with the CEX 602 (e.g., upload the public key into the blockchain 401, thereby defining a blockchain account for the player) while maintaining the private key in secret.

Figure 7:
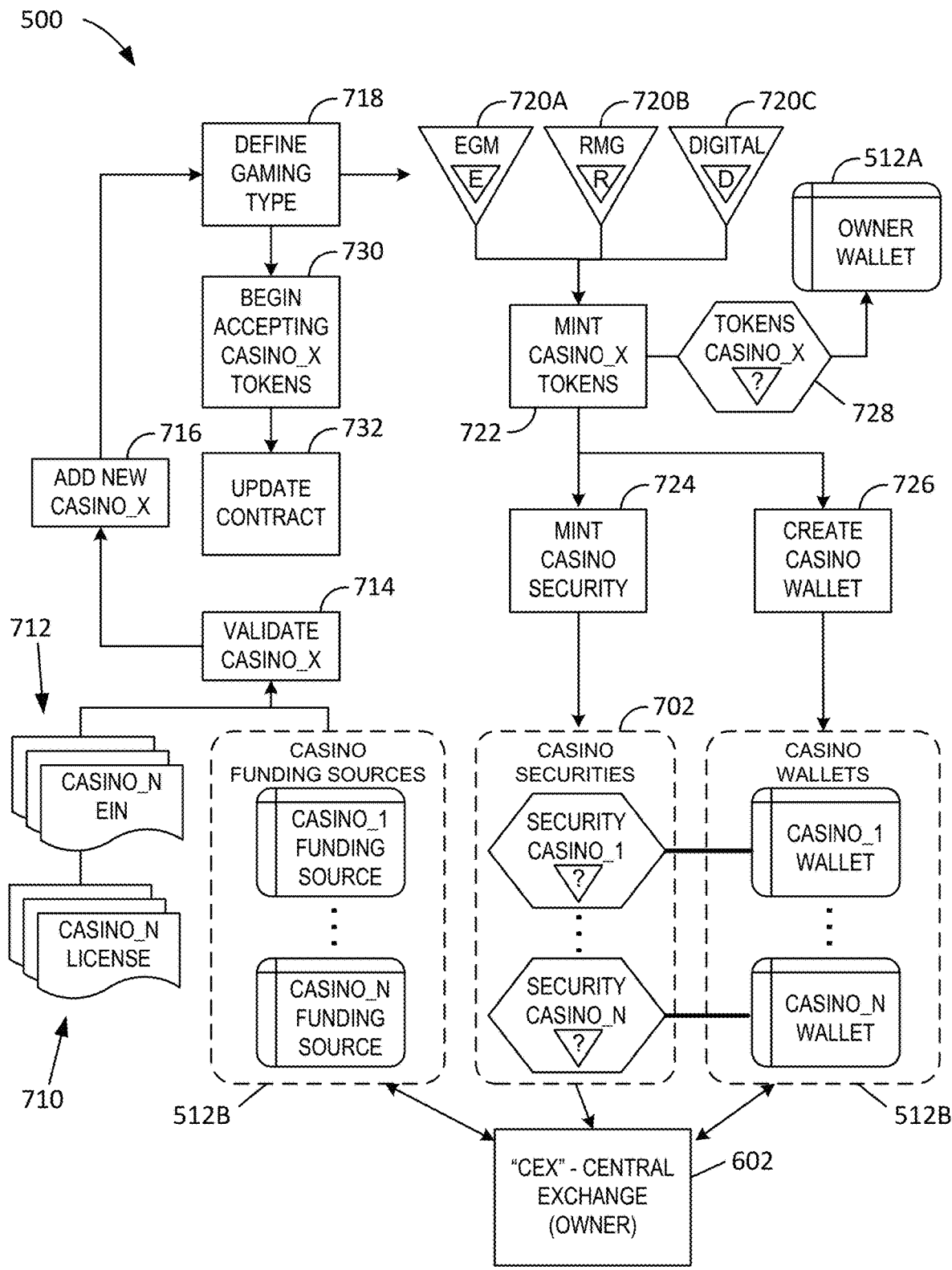
FIG. 7 illustrates a process for adding a new casino to the blockchain system.

FIG. 7 illustrates a process for adding a new casino to the blockchain system 500. In the example embodiment, when a new casino (e.g., "Casino_X") joins the blockchain system 500, the CEX 602 validates various aspects of the new casino at operation 714, including proof of gambling license 710 for the casino, the employer identification number ("EIN") of the casino, and perhaps one or more casino FSs 512B. When all validating information is verified, the new casino is added to the blockchain system 500 at operation 716.

At operation 718, the CEX 602 identifies and defines which gaming type 720 the new casino will support. In the example embodiment, the blockchain system 500 defines three types of gaming environments, or gaming types 720. The first gaming type 720 is land-based gaming on electronic gaming devices, shown here as EGM 720A. Such land-based electronic gaming devices include the EGMs 104 and gaming devices 200 shown in FIG. 1 to FIG. 2C (e.g., stationary cabinet-oriented or tabletop gaming devices). The second gaming type 720 is online real money gambling, shown here as RMG 720B. Such online, real money gambling includes online gambling using players' mobile devices, such as EUDs 264 (shown in FIG. 2C). The third gaming type 720 is digital gaming or social gaming, shown here as digital 720C. Digital gaming involves in-game-only virtual currencies (e.g., "fake money") that are not redeemable for real money. Players typically participate in digital gaming via their mobile devices, such as EUDs 264, or similar devices.

At operation 722, the CEX 602 creates (e.g., "mints") casino tokens for the new casino on the system blockchain 401 (shown here as tokens Casino_X 728). In the example embodiment, creating new casino tokens includes creating a new partition (e.g., as shown and described in relation to FIG. 4). These casino tokens 728 are distinguished from security tokens in that casino tokens 728 are PFTs that are configured to be exchangeable for game play (e.g., on gaming devices provided by the associated casino, such as in the land-based environment 402 of FIG. 4, or via online real money or social gaming platforms provided by the associated casino, such as in the digital environment 404 of FIG. 4). In the example embodiment, every casino token 728 and security token has a tokenID, and each are discrete and are non-partitionable. Casino tokens 728 can be configured to be fungible with other casino tokens 728, but securities are non-fungible except for within itself. Casino tokens 728 of the same tokenID are fully fungible, and casino tokens 728 of differing tokenIDs are not fungible by default. When casino tokens 728 are minted (e.g., created within the system blockchain 401), all of the casino tokens 728 for the new casino are by default assigned to the owner wallet 512A. Once enabled for use, the new casino tokens 728 may then be sold to players for game play or to the casino for support of game play awards (e.g., as purchase transactions on the system blockchain 401).

At operation 724, in the example embodiment, the CEX 602 creates (e.g., "mints") a security token 702 for the new casino. Security tokens enable functionalities, whereby without the security token 702, the associated functions are disabled for all but the owner. Security tokens 702 may be referred to herein as simply "securities." In the example embodiment, security tokens 702 enable an address to transfer a corresponding casino token 728 (e.g., on the system blockchain 401). A wallet 512 with a security token 702 for an associated transfer is defined as secure, such that any secure address may transfer the particular casino tokens 728 to any other secure address. Securities cannot be transferred. They can only be minted and burned (e.g., created or deleted). Further, the security token 702 identifies one of the game types, EGM, RMG, or digital. A casino security is a proof to the blockchain system 500 that an operator with a security for a corresponding game type (e.g., class of gaming/gambling) is lawfully conducting such gaming.

Figure 8:
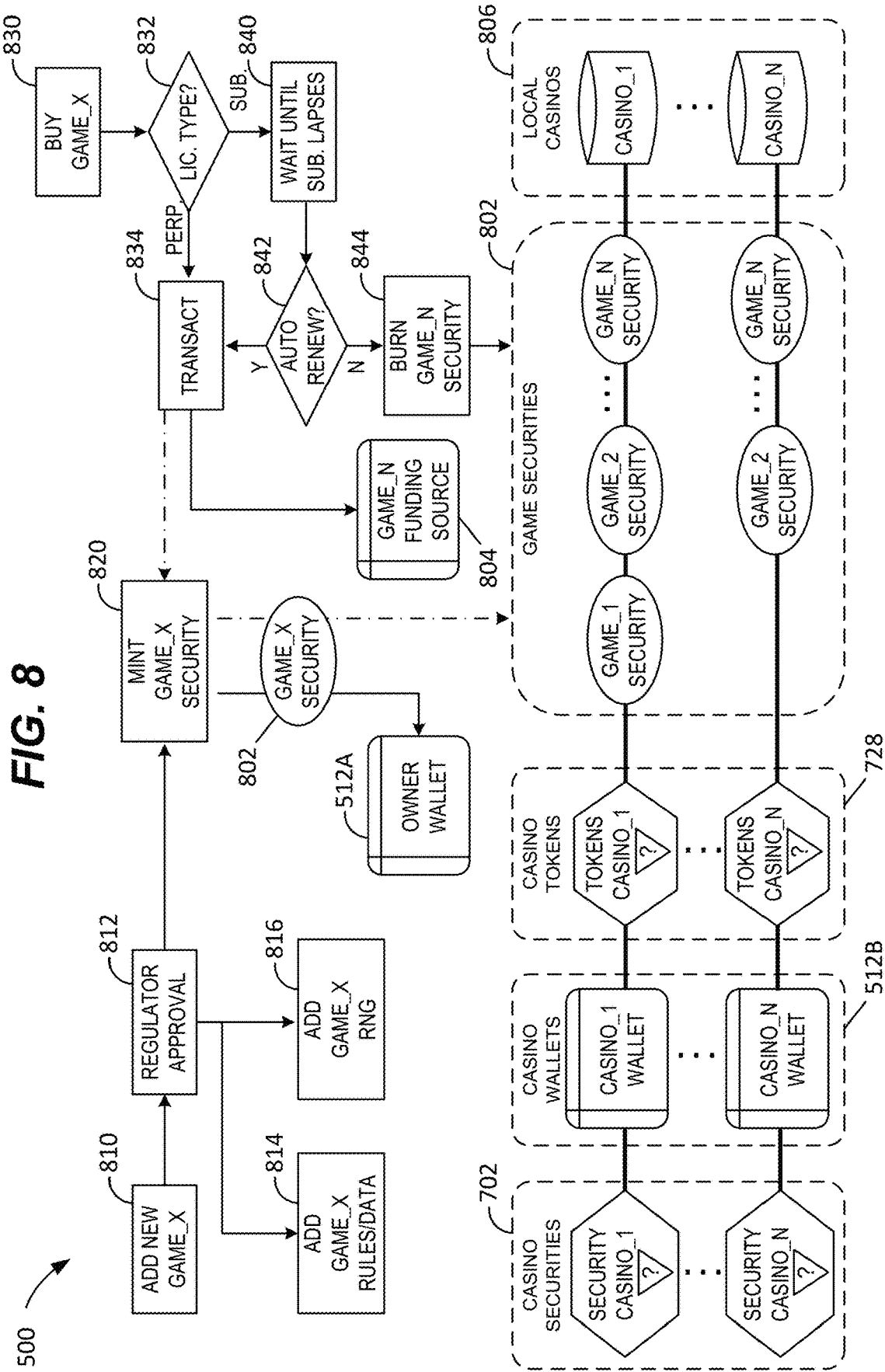
FIG. 8 illustrates a process for adding a new game to the blockchain system and configuring a particular casino to be allowed to operate that game in the blockchain system.
Figure 9:
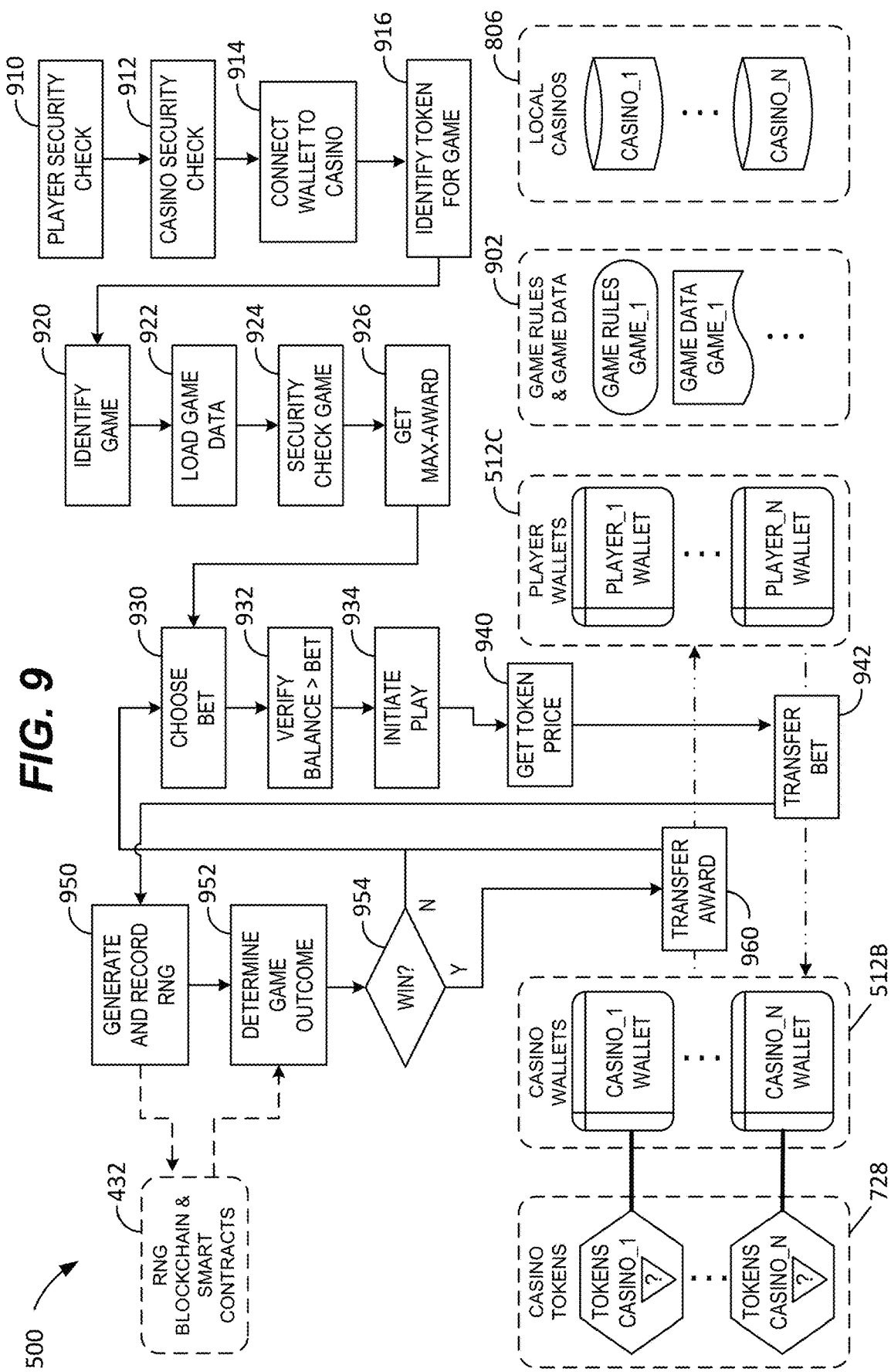
FIG. 9 illustrates a process for conducting game play within the blockchain system.

At operation 726, in the example embodiment, the CEX 602 creates a casino wallet 512B for the new casino (e.g., on the system blockchain 401). Each casino defined in the blockchain system 500 has a casino wallet 512B, as well as an associated security token 702 for transacting in their own casino tokens 728. FIGS. 7-9 use bold line to visually identify the associations between various blockchain features for a given casino.

Once the casino is established within the blockchain system 500, the CEX 602 may be configured to begin accepting tokens 728 for the new casino. Once token transactions are enabled for the new casino tokens 728, purchase and redemption of tokens 728 by players and the casino are permitted to occur, and game play transactions (e.g., bets and awards) are permitted to occur. At operation 732, smart contracts are updated on the system blockchain 401.

FIG. 8 illustrates a process for adding a new game to the blockchain system 500 and configuring a particular casino to be allowed to operate that game in the blockchain system 500. In the example embodiment, when a new game (e.g., "Game_X") is added to the blockchain system 500, a new game is added by the CEX 602 at operation 810. At operation 812, the CEX 602 verifies that the new game has been approved by regulators to be deployed in gaming. Each game includes game rules, game data, and game art and sounds (e.g., game assets), which can be embodied in executables, pay tables (e.g., used in RNG outcome and award determination), and the like. This game content is typically reviewed by regulators prior to deployment in live gaming environments. At operation 814, the game rules and data are added to the blockchain system 500 (e.g., to the game art and sound 448, to the game database 432 shown in FIG. 4). At operation 816, the pay tables and RNG are added to the blockchain system 500 (e.g., to the RNG blockchain 432 as a smart contract, to the RNG engine 460 shown in FIG. 4).

At operation 820, in the example embodiment, the CEX 602 creates ("mints") a game security token (or just "game security") 802 for the new game. A game security 802 for a particular game functions as a license to operate that particular game. When a contract makes a call from an address of a casino (e.g., to get game data from a remote game server), the license for that particular game to that particular requesting casino can be verified. By default the game security 802 for the new game is assigned to the owner wallet 512A.

At operation 830, in the example embodiment, a casino acquires rights (e.g., "buys") in a particular game (e.g., from the owner). If, at test 832, the license type is a perpetual license, then the CEX 602 performs a transaction for the licensed rights at operation 834, the proceeds from which go into a funding source 804 for that game. Once the transaction is confirmed, the CEX 602 creates ("mints") a game security token 802 for that purchasing casino. At any particular time, each casino may have numerous game securities 802 active in the blockchain system 500, thus allowing that casino to operate many games. If, at test 832, the license type is a subscription, the CEX 602 performs an initial transaction (e.g., as in operations 834, 820) and then waits until the subscription lapses at operation 840. If the subscription is set to auto renew at test 842, another transaction for the renewal is performed at operation 834, otherwise the CEX 602 deletes ("burns") the game security token 802 for that particular casino (e.g., on the system blockchain 401). FIG. 8 represents this varied assignment of game securities 802 with each associated casino, casino security 802, casino wallet 512B, casino token 728, and local casino database 806 with bold line.

FIG. 9 illustrates a process for conducting game play within the blockchain system 500. In the example embodiment, a player begins a new play session with a particular operator/casino (e.g., an in-person session at a land-based EGM 104, an on-premise or remote gaming session on a mobile device, or the like). At operation 910, the player wallet 512C is identified for the gaming session and a particular casino token 728. At operations 912 and 914, player security and casino security are checked by the blockchain system 500 (e.g., establishing and verifying player identity, casino identity, registration with the blockchain system 500, existence of player security 604 for the player and casino security and the like). A particular game is identified at operations 916 and 920. At operation 922, game data is loaded on the gaming device and a security check for the game is performed at operation 924 (e.g., verifying that the particular casino has a game security token 802 for the identified game). In the example embodiment, operations 910-926 are performed by the local device 806 (e.g., an operator server for the casino, such as CMS 114 or the like).

At operation 930, the gaming device receives a chosen bet amount for a particular play of a game (e.g., as input by the player in tokens). At operation 932, the blockchain system 500 verifies that the player has a token balance enough to cover the given bet amount (e.g., by inspecting the player wallet 512C on the system blockchain 401 for a token balance). At operation 934, the gaming device initiates game play (e.g., beginning the visual displays on the gaming device). At operation 940, a token price is identified for the bet amount.

At operation 942, a bet transaction is created (e.g., by the gaming device, by a remote game server, by the CEX 602) and transmitted to the system blockchain 401 transferring the bet amount from the player wallet 512C of the active player to the casino wallet 512B of the associated casino. This bet transaction triggers a smart contract 436 on the system blockchain 436 to engage the RNG blockchain and smart contracts 432 to generate and record an RNG outcome at operation 950. The RNG outcome includes an RNG value that is used to determine a game outcome at operation 952 (e.g., using the pay table of the particular game). If, at test 954, the game outcome is a "win" for the player (e.g., a non-zero payout award), then the system smart contract generates and transmits an award transaction into the system blockchain at operation 960 that causes an award amount, in casino tokens 728, to be transferred from the casino wallet 512B to the player wallet 512C. Further, the RNG and game outcome is transmitted back to the gaming device, and the game displays the associated game result (e.g., in both visual graphics and award amount), as well as update the balance on the gaming device to reflect the withdrawal of the bet amount and possibly the addition of an award amount.

While the disclosure has been described with respect to the figures, it will be appreciated that many modifications and changes may be made by those skilled in the art without departing from the spirit of the disclosure. Any variation and derivation from the above description and figures are included in the scope of the present disclosure as defined by the claims.

What is claimed is:

1. A blockchain system for supporting electronic gaming on a plurality of electronic gaming devices, the blockchain system comprising:
    a primary blockchain defining a first set of tokens configured to be used for game play for a first gaming operator, the first set of tokens being partially fungible tokens (PFTs) on the primary blockchain; and
    a system server participating in the primary blockchain and comprising at least one processor executing instructions that are configured to cause the at least one processor to:
        identify a game outcome from a play of an electronic game based on an output of a random number generator, wherein the game outcome includes an award amount of PFTs;
        generate a blockchain transaction that includes an operator address as a funds source account of the blockchain transaction, a player address as a destination account of the blockchain transaction, and the award amount of PFTs; and
        transmit the blockchain transaction into the primary blockchain, thereby transferring the award amount of PFTs.

2. The blockchain system of claim 1, further comprising a secondary blockchain that includes a first smart contract, the first smart contract is configured to:
    generate the output of the random number generator; and
    record the output of the random number generator within the secondary blockchain.

3. The blockchain system of claim 2, wherein the primary blockchain includes a second smart contract, the second smart contract is configured to trigger execution of the first smart contract based on a bet transaction having been performed on the primary blockchain.

4. The blockchain system of claim 1, wherein the instructions are further configured to cause the at least one processor to:
    create a security token on the primary blockchain, the security token is configured to control access to the electronic game, thereby allowing gaming devices associated with the first gaming operator to perform bet transactions on the primary blockchain during game play of the electronic game.

5. The blockchain system of claim 1, wherein the instructions are further configured to cause the at least one processor to:
    create a security token on the primary blockchain, wherein the security token is configured to control participation rights of the first gaming operator in the primary blockchain, thereby allowing the first gaming operator to perform transactions on the primary blockchain with the first set of tokens.

6. The blockchain system of claim 1, wherein the primary blockchain further defines a second set of tokens configured to be used for game play for a second gaming operator, the second set of tokens being partially fungible tokens (PFTs) on the primary blockchain, the second set of tokens being different than the first set of tokens.

7. The blockchain system of claim 1, wherein the first set of tokens is configured with a gaming type that includes one of land-based gaming, online real money gaming, or online social gaming, wherein the primary blockchain is configured to allow transactions in the first set of tokens for only game play of the gaming type.

8. A computer-implemented method for supporting electronic gaming implemented by at least one processor in communication with at least one memory, the at least one processor participating in a blockchain system comprising a first blockchain, the computer-implemented method comprising:
    creating, by the at least one processor and on the first blockchain in the blockchain system, a first set of tokens, the first set of tokens being configured to facilitate game play transactions for an electronic game of a first gaming operator, the first set of tokens being partially fungible tokens (PFTs) on the first blockchain;
    identifying, by the at least one processor, a game outcome from a play of the electronic game based on an output of a random number generator, wherein the game outcome includes an award amount of PFTs;
    generating, by the at least one processor, a blockchain transaction that includes an operator address as a funds source account of the blockchain transaction, a player address as a destination account of the blockchain transaction, and the award amount of PFTs; and
    transmitting, by the at least one processor into the first blockchain in the blockchain system, the blockchain transaction, thereby transferring the award amount of PFTs.

9. The method of claim 8, further comprising:
    defining a second blockchain of the blockchain system that includes a first smart contract, the first smart contract is configured to:
        generate the output of the random number generator; and
        record the output of the random number generator within the second blockchain.

10. The method of claim 9, wherein the first blockchain includes a second smart contract, the second smart contract being configured to trigger execution of the first smart contract based on a bet transaction having been performed on the first blockchain.

11. The method of claim 8, further comprising creating a security token on the first blockchain, the security token being configured to control access to the electronic game, thereby allowing gaming devices associated with the first gaming operator to perform bet transactions on the first blockchain during game play of the electronic game.

12. The method of claim 8, further comprising creating a security token on the first blockchain, the security token being configured to control participation rights of the first gaming operator in the first blockchain, thereby allowing the first gaming operator to perform transactions on the first blockchain with the first set of tokens.

13. The method of claim 8, wherein the first blockchain further defines a second set of tokens configured to be used for game play for a second gaming operator, the second set of tokens being partially fungible tokens (PFTs) on the first blockchain, the second set of tokens being different than the first set of tokens.

14. The method of claim 8, wherein the first set of tokens is configured with a gaming type that includes one of land-based gaming, online real money gaming, or online social gaming, wherein the first blockchain is configured to allow transactions in the first set of tokens for only game play of the gaming type.

15. A blockchain system comprising:
a memory storing a primary blockchain; and
at least one processor executing instructions that are configured to cause the at least one processor to:
create a first set of tokens as partially fungible tokens (PFTs) on the primary blockchain, the first set of tokens being configured to be used for game play for a first gaming operator;
identify a game outcome from a play of an electronic game based on an output of a random number generator, wherein the game outcome includes an award amount of PFTs;
generate a blockchain transaction that includes an operator address as a funds source account of the blockchain transaction, a player address as a destination account of the blockchain transaction, and the award amount of PFTs; and
transmit the blockchain transaction into the primary blockchain, thereby transferring the award amount of PFTs.

16. The blockchain system of claim 15, wherein the memory further stores a secondary blockchain that includes a first smart contract, wherein the first smart contract is configured to:
generate the output of the random number generator; and
record the output of the random number generator within the secondary blockchain.

17. The blockchain system of claim 16, wherein the primary blockchain includes a second smart contract, wherein the second smart contract is configured to trigger execution of the first smart contract based on a bet transaction having been performed on the primary blockchain.

18. The blockchain system of claim 15, wherein the instructions are further configured to cause the at least one processor to create a security token on the primary blockchain, the security token is configured to control access to the electronic game, thereby allowing gaming devices associated with the first gaming operator to perform bet transactions on the primary blockchain during game play of the electronic game.

19. The blockchain system of claim 15, wherein the instructions are further configured to cause the at least one processor to create a security token on the primary blockchain, wherein the security token is configured to control participation rights of the first gaming operator in the primary blockchain, thereby allowing the first gaming operator to perform transactions on the primary blockchain with the first set of tokens.

20. The blockchain system of claim 15, wherein the first set of tokens is configured with a gaming type that includes one of land-based gaming, online real money gaming, or online social gaming, wherein the primary blockchain is configured to allow transactions in the first set of tokens for only game play of the gaming type.

* * * * *